United States Patent
Kim et al.

(10) Patent No.: US 12,167,321 B1
(45) Date of Patent: Dec. 10, 2024

(54) CELL ACCESS FOR HIDING NETWORK PRESENCE AND OPERATION

(71) Applicant: QUALCOMM Incorporated, San Diego, CA (US)

(72) Inventors: Hongil Kim, San Diego, CA (US); Gavin Bernard Horn, La Jolla, CA (US); Soo Bum Lee, San Diego, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 17/570,540

(22) Filed: Jan. 7, 2022

(51) Int. Cl.
| | |
|---|---|
| *H04W 48/16* | (2009.01) |
| *H04W 12/03* | (2021.01) |
| *H04W 12/041* | (2021.01) |
| *H04W 56/00* | (2009.01) |

(52) U.S. Cl.
CPC ........... *H04W 48/16* (2013.01); *H04W 12/03* (2021.01); *H04W 12/041* (2021.01); *H04W 56/001* (2013.01)

(58) Field of Classification Search
CPC ................. H04W 48/16; H04W 12/03; H04W 12/041; H04W 56/001
See application file for complete search history.

(56) References Cited

U.S. PATENT DOCUMENTS

| | | | |
|---|---|---|---|
| 2018/0376438 A1 | 12/2018 | Islam et al. | |
| 2019/0246335 A1* | 8/2019 | Mukherjee | ............ H04W 48/08 |
| 2020/0137701 A1 | 4/2020 | Harada et al. | |
| 2020/0178148 A1* | 6/2020 | Lee | ...................... H04L 27/2605 |
| 2020/0313835 A1* | 10/2020 | Ji | ............................ H04L 5/0053 |
| 2020/0359447 A1* | 11/2020 | Yang | .................. H04W 74/0833 |
| 2021/0021363 A1* | 1/2021 | Lee | ......................... H04W 24/10 |
| 2021/0112464 A1 | 4/2021 | Liu | |
| 2021/0297853 A1* | 9/2021 | Lee | ........................ H04W 72/30 |
| 2023/0180156 A1* | 6/2023 | Xia | ..................... H04W 56/001 370/350 |

OTHER PUBLICATIONS

International Search Report and Written Opinion—PCT/US2023/060218—ISA/EPO—Jun. 14, 2023.
Partial International Search Report—PCT/US2023/060218—ISA/EPO—Apr. 21, 2023.

* cited by examiner

*Primary Examiner* — Nguyen T Vo
(74) *Attorney, Agent, or Firm* — Holland & Hart LLP

(57) ABSTRACT

Methods, systems, and devices for wireless communications are described. A user equipment (UE) may receive synchronization messages from a public cell that indicates synchronization information. The UE may input information received from the one or more synchronization messages into one or more functions provisioned at the UE to derive a set of control resources associated with a private cell. The UE may monitor the set of control resources to receive encrypted system information from the private cell. The UE may decrypt the system information of the private cell by deriving a cell specific broadcast key associated with the private cell. In some examples, the UE may derive the cell specific broadcast key based on the one or more functions provisioned at the UE. As such, the UE may transmit to the private cell via the set of control resources a random access message indicating successful decryption of the system information.

24 Claims, 17 Drawing Sheets

CELL ACCESS FOR HIDING NETWORK PRESENCE AND OPERATION

FIELD OF TECHNOLOGY

The following relates to wireless communications, including cell access for hiding network presence and operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support cell access for hiding network presence and operation. Generally, the described techniques enable a user equipment (UE) to detect the presence of a hidden network by receiving one or more synchronization messages from a public cell that may be associated with one or more private cells of the hidden network. The UE may establish connection with the public cell and may receive one or more synchronization messages that may include timing synchronization information and one or more synchronization signal block (SSB) parameters. In some cases, the UE may be preconfigured (e.g., during manufacturing or prior to deployment of the UE or hidden network) with one or more functions used to derive control resources associated with one or more of the private cells. For example, the UE may input the information from the public cell information into the one or more functions to derive a control resource set (CORESET) associated with a first private cell. In some cases, the UE may monitor the CORESET to receive system information associated with the first private cell. Upon receiving the system information based on the CORESET, the UE may decrypt the system information using a cell specific broadcast key associated with the private cell.

A method for wireless communications at a UE is described. The method may include receiving one or more synchronization messages from a first cell, the one or more synchronization messages indicating synchronization information associated with the first cell, monitoring a set of control resources associated with a second cell for system information associated with the second cell based on the one or more synchronization messages from the first cell, where the set of control resources associated with the second cell is determined by using at least a portion of the synchronization information associated with the first cell as input for one or more functions associated with the second cell, and decoding the system information associated with the second cell based on monitoring the set of control resources.

An apparatus for wireless communications at a UE is described. The apparatus may include a processor, memory coupled with the processor, and instructions stored in the memory. The instructions may be executable by the processor to cause the apparatus to receive one or more synchronization messages from a first cell, the one or more synchronization messages indicating synchronization information associated with the first cell, monitor a set of control resources associated with a second cell for system information associated with the second cell based on the one or more synchronization messages from the first cell, where the set of control resources associated with the second cell is determined by using at least a portion of the synchronization information associated with the first cell as input for one or more functions associated with the second cell, and decode the system information associated with the second cell based on monitoring the set of control resources.

Another apparatus for wireless communications at a UE is described. The apparatus may include means for receiving one or more synchronization messages from a first cell, the one or more synchronization messages indicating synchronization information associated with the first cell, means for monitoring a set of control resources associated with a second cell for system information associated with the second cell based on the one or more synchronization messages from the first cell, where the set of control resources associated with the second cell is determined by using at least a portion of the synchronization information associated with the first cell as input for one or more functions associated with the second cell, and means for decoding the system information associated with the second cell based on monitoring the set of control resources.

A non-transitory computer-readable medium storing code for wireless communications at a UE is described. The code may include instructions executable by a processor to receive one or more synchronization messages from a first cell, the one or more synchronization messages indicating synchronization information associated with the first cell, monitor a set of control resources associated with a second cell for system information associated with the second cell based on the one or more synchronization messages from the first cell, where the set of control resources associated with the second cell is determined by using at least a portion of the synchronization information associated with the first cell as input for one or more functions associated with the second cell, and decode the system information associated with the second cell based on monitoring the set of control resources.

Some examples of the method, apparatuses, and non-transitory computer-readable medium described herein may further include operations, features, means, or instructions for deriving a broadcast root key based on a long term key, deriving a cell specific broadcast key associated with the second cell based on the broadcast root key and a cell identifier of the second cell, the cell identifier of the second cell based on an identifier of the first cell and a channel number of the first cell, and decrypting the system information associated with the second cell based on the cell specific broadcast key.

Some examples of the method, apparatuses, and non-transitory computer-readable medium described herein may further include operations, features, means, or instructions for transmitting, to the second cell and using a set of resources associated with the second cell, a random access message indicating successful decryption of the system information, the set of resources associated with the second cell based on the system information.

In some examples of the method, apparatuses, and non-transitory computer-readable medium described herein, receiving the one or more synchronization messages indicating the synchronization information associated with the first cell may include operations, features, means, or instructions for receiving, from the first cell, timing synchronization information and one or more synchronization signal block parameters associated with the first cell.

In some examples of the method, apparatuses, and non-transitory computer-readable medium described herein, receiving the one or more synchronization signal block parameters may include operations, features, means, or instructions for receiving a primary synchronization signal, a secondary synchronization signal, or a physical broadcast radio channel associated with the first cell, where the one or more synchronization signal block parameters may be based on the primary synchronization signal, the secondary synchronization signal, or the physical broadcast radio channel associated with the first cell.

Some examples of the method, apparatuses, and non-transitory computer-readable medium described herein may further include operations, features, means, or instructions for inputting the timing synchronization information into a first function of the one or more functions associated with the second cell, where an output of the first function includes a time offset associated with the second cell relative to the first cell, inputting the one or more synchronization signal block parameters associated with the first cell into a second function of the one or more functions associated with the second cell, where an output of the second function includes one or more synchronization signal block parameters associated with the second cell, and monitoring the set of control resources associated with the second cell based on the time offset and the one or more synchronization signal block parameters associated with the second cell.

In some examples of the method, apparatuses, and non-transitory computer-readable medium described herein, the second cell may be one cell of a group of one or more cells.

In some examples of the method, apparatuses, and non-transitory computer-readable medium described herein, monitoring the set of control resources may include operations, features, means, or instructions for monitoring multiple sets of control resources associated with the group of one or more cells, where each of the multiple sets of control resources associated with a respective cell of the group of one or more cells, and where each of the multiple sets of control resources may be based on the synchronization information associated with the first cell being input to one or more respective functions corresponding to the respective cell of the group of one or more cells.

Some examples of the method, apparatuses, and non-transitory computer-readable medium described herein may further include operations, features, means, or instructions for measuring respective system information for each cell of the group of one or more cells, selecting the first cell from the group of one or more cells based on measuring the respective system information for each cell, and transmitting, to the first cell, a random access message indicating successful decrypting of system information received from the first cell.

In some examples of the method, apparatuses, and non-transitory computer-readable medium described herein, monitoring the set of control resources may include operations, features, means, or instructions for receiving, from the first cell, the one or more synchronization messages including a public cell identity associated with the first cell, a physical broadcast channel associated with the first cell, and a system frame number associated with the first cell.

In some examples of the method, apparatuses, and non-transitory computer-readable medium described herein, the UE may be preconfigured with network information indicating that the first cell may be associated with the second cell.

In some examples of the method, apparatuses, and non-transitory computer-readable medium described herein, the one or more functions associated with the second cell may be preconfigured at the UE.

A method for wireless communications at a second cell is described. The method may include receiving one or more synchronization messages from a first cell, the one or more synchronization messages indicating synchronization information associated with the first cell, configuring a set of control resources associated with the second cell for system information associated with the first cell based on receiving the one or more synchronization messages from the first cell, where the set of control resources associated with the second cell is determined by inputting the synchronization information associated with the first cell into one or more functions associated with the second cell, and transmitting the system information associated with the second cell via the set of control resources.

An apparatus for wireless communications at a second cell is described. The apparatus may include a processor, memory coupled with the processor, and instructions stored in the memory. The instructions may be executable by the processor to cause the apparatus to receive one or more synchronization messages from a first cell, the one or more synchronization messages indicating synchronization information associated with the first cell, configure a set of control resources associated with the second cell for system information associated with the first cell based on receiving the one or more synchronization messages from the first cell, where the set of control resources associated with the second cell is determined by inputting the synchronization information associated with the first cell into one or more functions associated with the second cell, and transmit the system information associated with the second cell via the set of control resources.

Another apparatus for wireless communications at a second cell is described. The apparatus may include means for receiving one or more synchronization messages from a first cell, the one or more synchronization messages indicating synchronization information associated with the first cell, means for configuring a set of control resources associated with the second cell for system information associated with the first cell based on receiving the one or more synchronization messages from the first cell, where the set of control resources associated with the second cell is determined by inputting the synchronization information associated with the first cell into one or more functions associated with the second cell, and means for transmitting the system information associated with the second cell via the set of control resources.

A non-transitory computer-readable medium storing code for wireless communications at a second cell is described. The code may include instructions executable by a processor to receive one or more synchronization messages from a first cell, the one or more synchronization messages indicating synchronization information associated with the first cell, configure a set of control resources associated with the second cell for system information associated with the first cell based on receiving the one or more synchronization messages from the first cell, where the set of control resources associated with the second cell is determined by inputting the synchronization information associated with the first cell into one or more functions associated with the second cell, and transmit the system information associated with the second cell via the set of control resources.

Some examples of the method, apparatuses, and non-transitory computer-readable medium described herein may further include operations, features, means, or instructions for receiving, from a UE, using a set of resources associated with the second cell, a random access message indicating successful decryption of the system information, the set of resources associated with the second cell based on the system information.

In some examples of the method, apparatuses, and non-transitory computer-readable medium described herein, receiving the one or more synchronization messages indicating the synchronization information associated with the second cell may include operations, features, means, or instructions for receiving, from the first cell, timing synchronization information and one or more synchronization signal block parameters associated with the first cell.

In some examples of the method, apparatuses, and non-transitory computer-readable medium described herein, receiving the one or more synchronization signal block parameters may include operations, features, means, or instructions for receiving a primary synchronization signal, a secondary synchronization signal, or a physical broadcast radio channel associated with the second cell, where the one or more synchronization signal block parameters may be based on the primary synchronization signal, the secondary synchronization signal, or the physical broadcast radio channel associated with the second cell.

Some examples of the method, apparatuses, and non-transitory computer-readable medium described herein may further include operations, features, means, or instructions for inputting the timing synchronization information into a first function of the one or more functions associated with the second cell, where an output of the first function includes a time offset associated with the second cell relative to the first cell, inputting the one or more synchronization signal block parameters associated with the first cell into a second function of the one or more functions associated with the second cell, where an output of the second function includes one or more synchronization signal block parameters associated with the second cell, and configuring the set of control resources associated with the second cell based on the time offset and the one or more synchronization signal block parameters associated with the second cell.

In some examples of the method, apparatuses, and non-transitory computer-readable medium described herein, the second cell may be one cell of a group of one or more cells.

In some examples of the method, apparatuses, and non-transitory computer-readable medium described herein, the one or more functions associated with the second cell may be preconfigured at the UE.

DETAILED DESCRIPTION

Figure 1:
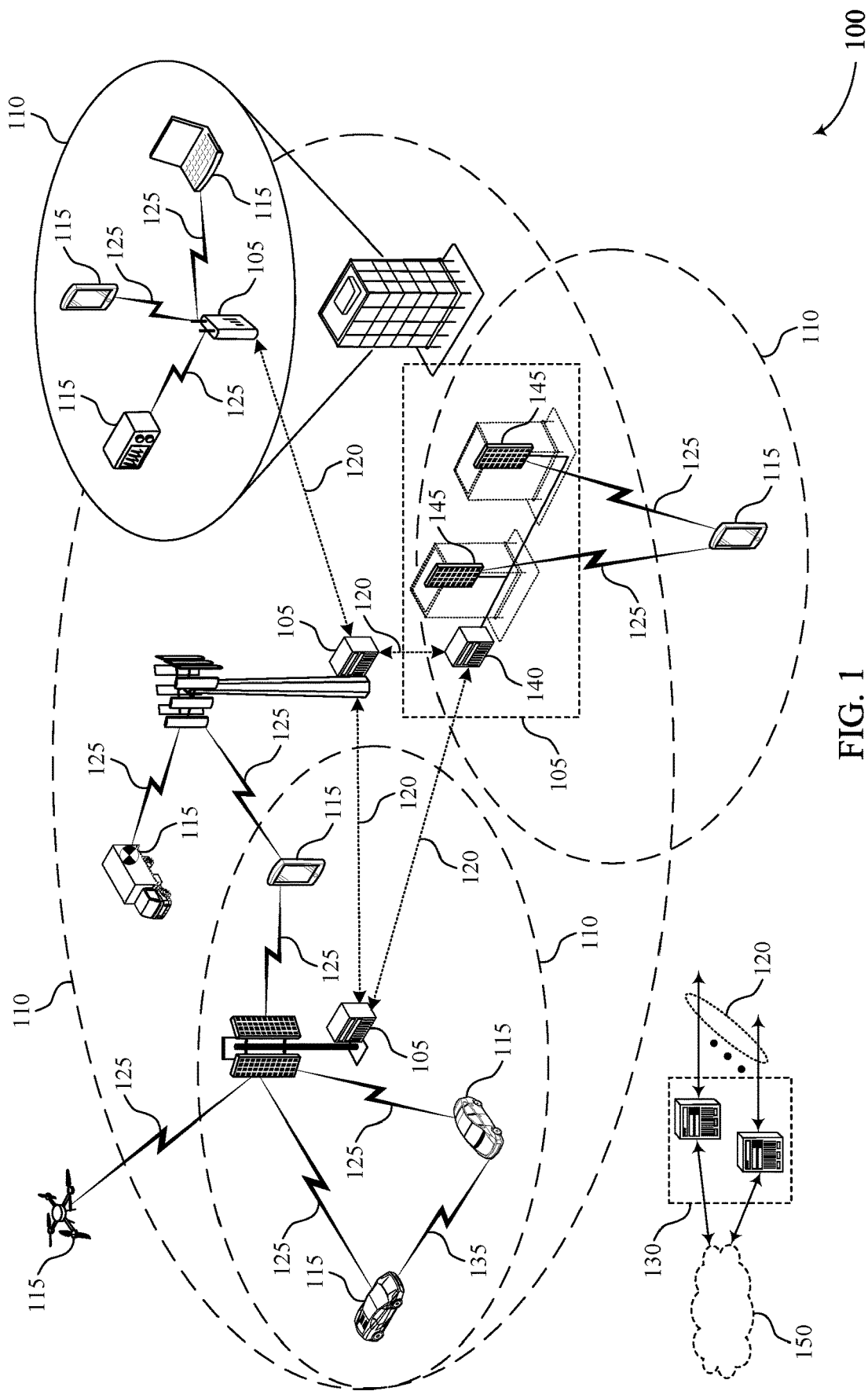
FIG. 1 illustrates an example of a wireless communications system that supports cell access for hiding network presence and operation in accordance with aspects of the present disclosure.

In some wireless communications, one or more wireless devices may operate in accordance with enhanced security implementations (such as protected access for ultra-secure communications (USC), among other security enhancements used for improving the security of a wireless communications system). For example, a user equipment (UE) may be authorized (e.g., preconfigured) to identify and decrypt system information and configurations from one or more network cells such as network cells associated with a private or hidden network. In such examples, the UE may be provisioned with a broadcast key associated with the one or more cells (e.g., multi-key provisioning or periodic key refresh) that may allow the UE to decrypt the system information broadcasted by the one or more cells via over-the-air (OTA) communications. However, in some examples of enhanced security implementations, a cell of the one or more cells may refrain from encrypting some synchronization messages (e.g., a synchronization signal block (SSB)) such that the UE may initially detect the presence of the private or hidden network associated with the one or more cells. As such, one or more other wireless devices, such as unauthorized wireless devices, may be capable of detecting the presence of the private or hidden network which may decrease the efficacy of security measures taken in enhanced security deployments.

According to the techniques described herein, a UE may detect the presence of a hidden network by receiving one or more synchronization messages from a public cell that may be associated with one or more private cells of the hidden network. For example, the authorized UE may be provisioned (e.g., preconfigured) with an identification of a public cell within the geographic area of the one or more cells of the hidden network. The UE may receive one or more synchronization messages that may include timing synchronization information and one or more SSB parameters from the public cell. In some cases, the UE may be preconfigured (e.g., prior to deployment of the UE or the hidden network) with one or more functions used to derive control resources associated with one or more of the private cells. For example, the UE may input the timing synchronization information from the public cell into a first function to determine a time offset of a first private cell relative to the public cell and may input the one or more SSB parameters of the public cell into a second function to determine one or more SSB parameters of the first private cell. As such, the UE may use the time offset and the one or more SSB parameters of the first private cell to determine a control resource set (CORESET) of the first private cell of the hidden network.

In some cases, the UE may determine the CORESET to receive system information from the first private cell. Upon receiving the system information determined by the CORESET, the UE may decrypt the system information using a derived cell specific broadcast associated with the first private cell. As such, the UE may decrypt the system information associated with the first private cell based on deriving the cell specific broadcast key.

Aspects of the disclosure are initially described in the context of wireless communications systems. Aspects of the disclosure are further described in the context of a process flow. Aspects of the disclosure are further illustrated by and described with reference to apparatus diagrams, system diagrams, and flowcharts that relate to cell access for hiding network presence and operation.

FIG. 1 illustrates an example of a wireless communications system 100 that supports cell access for hiding network presence and operation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, an extended reality (XR) device or headset, or a personal computer. In some examples, a UE 115 may include or be referred to as a wireless local loop (WLL)

station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples of wireless communications, one or more wireless devices may operate in accordance with enhanced security implementations. For example, a UE 115 may be authorized (e.g., preconfigured) to identify and decrypt system information and configurations from one or more cells (e.g., base stations 105) associated with a network. The UE 115 may detect the presence of the associated network via receiving one or more synchronization messages from a public cell (e.g., a base station 105). The UE 115 may receive one or more synchronization messages that may include timing synchronization information and one or more SSB parameters.

In some cases, the UE 115 may be preconfigured by a hidden network (not illustrated in FIG. 1) with one or more functions used to derive control resources associated with one or more cells of the hidden network. For example, the UE 115 may input the timing synchronization information from the public cell into a first function to determine a time offset of a first cell of the hidden network relative to the public cell and may input the one or more SSB parameters of the public cell into a second function to determine one or more SSB parameters of the first cell of the hidden network. As such, the UE 115 may determine SSB parameters for cells of the hidden network based on receiving SSB parameters from the public cells, allowing the cells of the hidden network to refrain from transmitting SSB parameters over-the-air.

Figure 2:
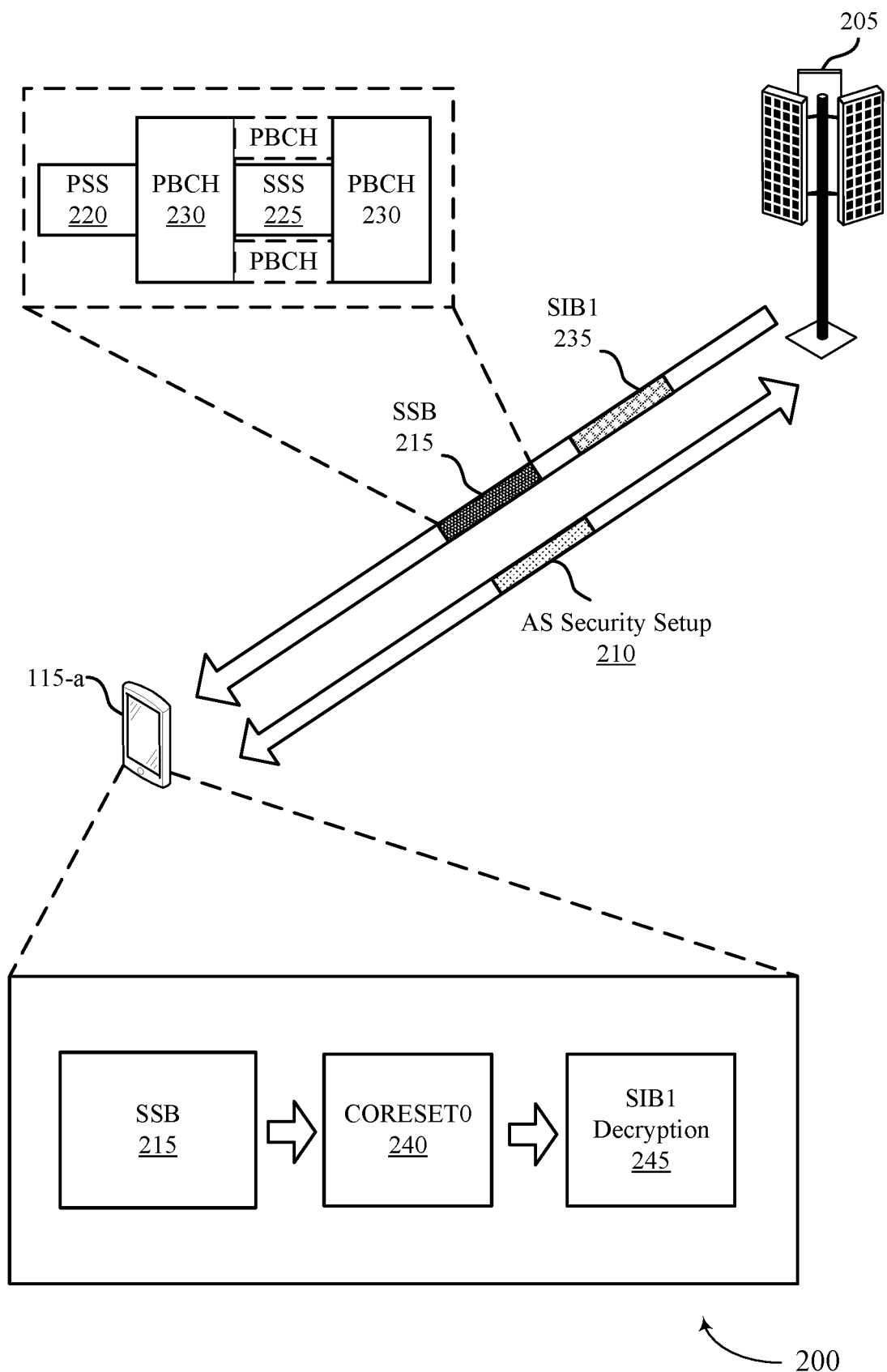
FIG. 2 illustrates an example of a wireless communications system that supports cell access for hiding network presence and operation in accordance with aspects of the present disclosure.
Figure 3A:
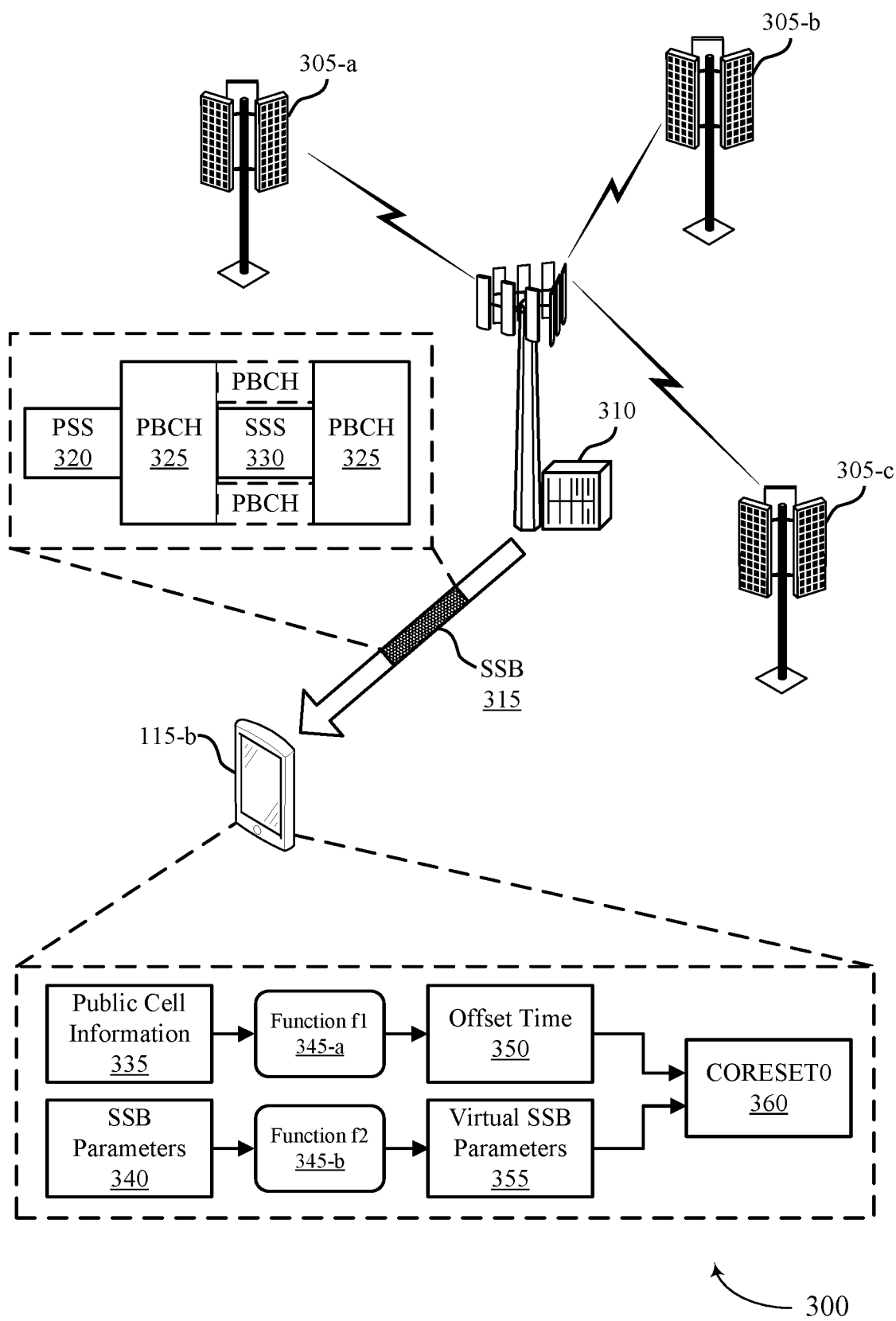
FIGS. 3A and 3B illustrates an example of a wireless communications system that supports cell access for hiding network presence and operation in accordance with aspects of the present disclosure.
Figure 3B:
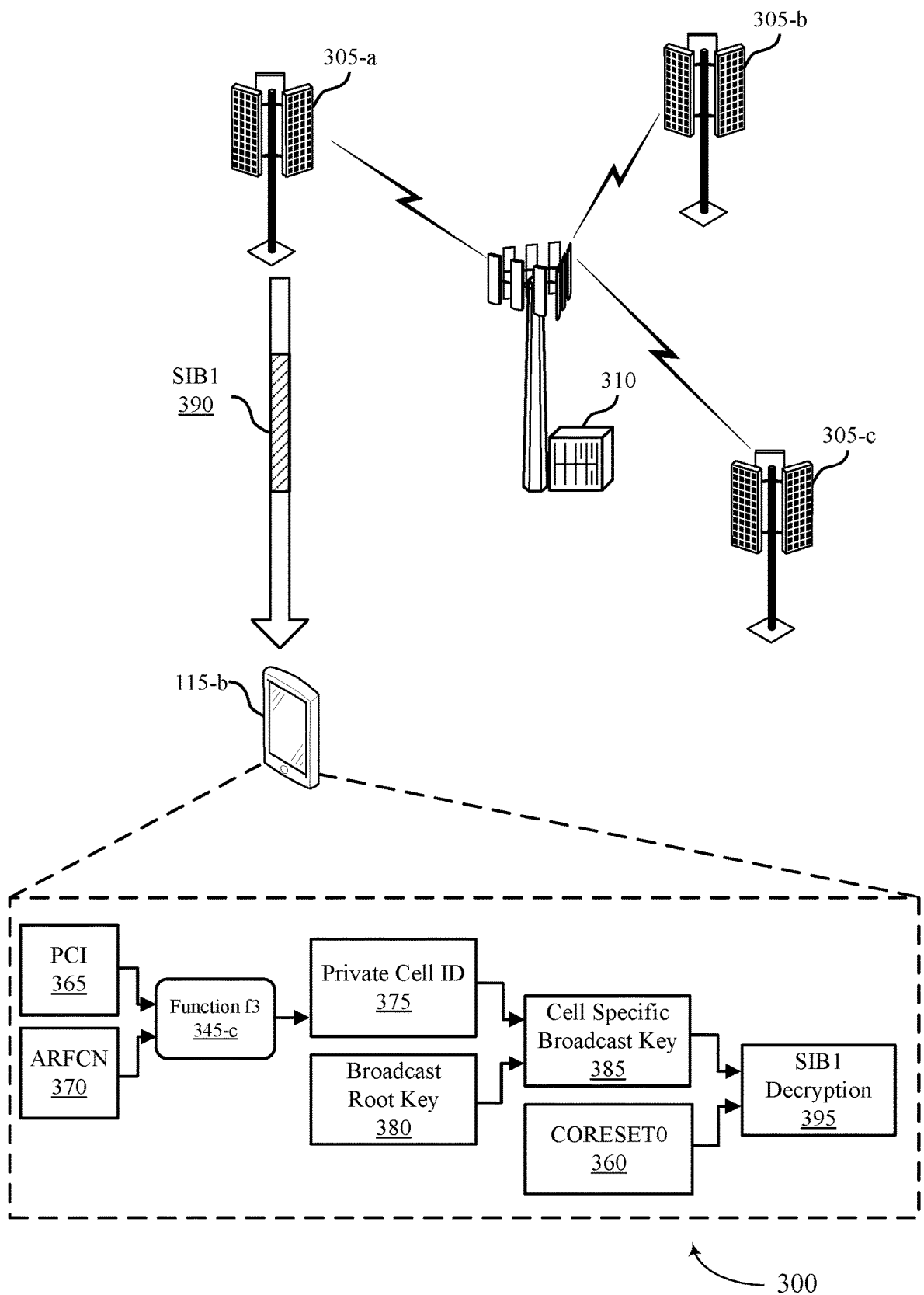
Figure 4:
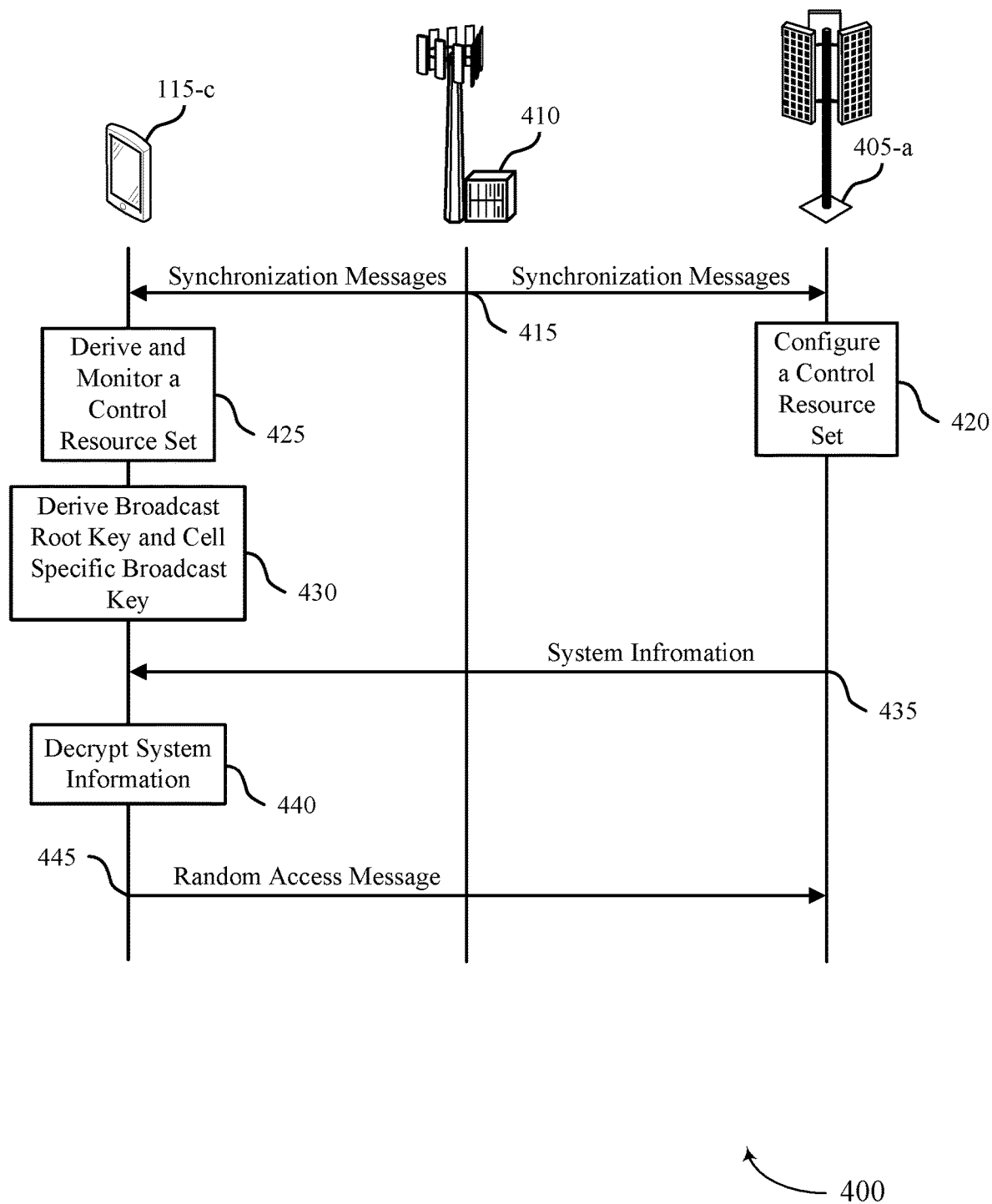
FIG. 4 illustrates an example of a process flow that supports cell access for hiding network presence and operation in accordance with aspects of the present disclosure.

Further discussion of a hidden network refraining from transmitting SSB parameters over-the-air is described herein, including with reference to FIGS. 2 through 4.

FIG. 2 illustrates an example of a wireless communications system 200 that supports cell access for hiding network presence and operation in accordance with aspects of the present disclosure. The wireless communication systems 200 may implement or be implemented by one or more aspects of the wireless communications system 100. For example, the wireless communications systems 200 may include a UE 115-*a* and a private cell 205 which may be respective examples of a UE 115 and a cell supported by a base station 105, as described with reference to FIG. 1. In some examples, the UE 115-*a* and the private cell 205 may operate in accordance with enhanced security implementations. Specifically, the UE 115-*a* may utilize a set of one or more functions to determine one or more control set resources to use for communication with the private cell 205. The private cell 205 may refrain from transmitting an SSB 215 over-the-air (OTA) to minimize detection of a private network associated with the UE 115-*a* and the private cell 205. It is noted that, while examples of some numbers of devices and types of devices are described herein, any number of devices and device types may support the techniques described in the present disclosure.

In some examples of wireless communications (e.g., 5G NR), security measures associated with OTA communications may be implemented at the packet data convergence protocol layer (PDPC) and above. For example, the PDPC layer may be associated with ciphering and integrity protection of OTA signaling and user data traffic. For signals that originate at layers below the PDPC layer (e.g., at a physical (PHY) layer, or a medium access control (MAC) layer) may not utilize the same ciphering and integrity protection for signals transmitted via the PDPC layer. Some examples of signal types that may be transmitted on the PHY or MAC layer may include, but are not limited to, SSB messages, physical downlink control channel (PDCCH) messages, physical uplink control channel (PUCCH) messages, MAC control element (MAC-CE) messages, radio link control (RLC) status reports, or PDCP status reports.

As such, a wireless communications system (e.g., the wireless communications system 200) may utilize techniques at the lower PHY and MAC layers to increase protection for transmitted signals. In some examples, enhanced security implementations may be used to hide information or signal transmission from unauthorized wireless devices. In such examples, the private cell 205 may transmit encrypted information for network selection and access to an authorized wireless device (e.g., the UE 115-*a*). Such enhanced security implementations may allow for the verification of various message types including broadcast messages. In some examples, enhanced security implementations may be used to detect potential security attacks (e.g., from unauthorized wireless devices), decrease signal vulnerability, increase detectability of different security attack types, utilize resource isolation to mitigate impact of jammers or spoofing based on UE 115-*a* state (e.g., separate air link resources for idle and connected mode operation), and leverage configuration for UE 115-*a* to detect jamming and spoofing attacks.

Additionally or alternatively, the wireless communications system 200 may utilize techniques which may include key provisioning for broadcast messages, in-band provisioning, baseline system acquisition and key derivation, enhanced system acquisition and key derivation, and UE 115-a information protection. For example, key provisioning for broadcast messages may be used to protect as OTA messages including broadcast messages such as system information. Such examples of protection may include the private cell 205 ciphering system information which may prevent unauthorized UEs 115 to access to the private network. In such examples, the UE 115-a may be provisioned (e.g., preconfigured) with a broadcast key associated with the private cell 205 which the UE 115-a may use to decrypt broadcast information from the private cell 205. In some examples, the provisioned broadcast key may include multi-key provisioning, periodic key refresh address potential, or a combination thereof. In some examples, the UE 115-a may be provisioned with an out-of-band broadcast key in which each message received from the private cell 205 may be protected. In some examples, the UE 115-a may be provisioned with an in-band broadcast key where some information may be transmitted unprotected (e.g., a primary synchronization signal (PSS) 220, and a secondary synchronization signal (SSS) 225) to enable initial access for UEs 115 that are not provisioned with a broadcast key (e.g., pinhole access).

In some examples, downlink control information (DCI) for a specific UE 115 (e.g., the UE 115-a) may be protected using a UE specific unicast key that the UE 115-a may derive during an access stratum (AS) security setup 210. For example, the UE 115-a may receive a public key from the private cell 205 (e.g., $K_{gNB}$) and a cell ID associated with the private cell 205 and use a key derivation function (KDF) provisioned at the UE 115-a to derive the unicast key (e.g., $K_{U\text{-}Cell}$=KDF ($K_{gNB}$, cell ID)). The UE specific unicast key may be used when the UE 115-a is in a radio resource control (RRC) connected state that is allocated with a cell radio network temporary identifier (C-RNTI) from the private cell 205. In some examples, the UE 115-a and the private cell 205 may use the unicast protection key for decryption for initial access after transmitting an AS security mode complete message to the private cell 205, for a handover procedure after sending an RRC reconfiguration complete to the private cell 205, for radio link failure (RLF) recovery after receiving RRC reestablishment from the private cell 205, or during an RRC inactive state after receiving an RRC resume message from the private cell 205.

In some examples, the UE 115-a may receive an SSB 215 from the private cell 205. For example, during reception of the SSB 215 from the private cell 205, the UE 115-a may receive a PSS 220 and an SSS 225 which may be signals used to synchronize wireless communications and may include a physical cell identity (PCI) which may be used to identify the private cell 205. The SSB 215 may also include a physical broadcast channel (PBCH) 230 which may carry demodulated reference signals (DMRS) and data (e.g., master information block (MIB) contents including system frame number (SFN) and hyper frame number (HFN)). In some examples, the UE 115-a may use the contents of the SSB 215 to derive a private cell 205 specific key. For example, the UE 115-a may use the SSB 215 in part to derive a control resource set (e.g., CORESET0 240) associated with the private cell 205 which may include a set of physical resources within a downlink resource grid used to carry encrypted data (e.g., a system information block (SIB1) 235). Based on determining the CORESET0 240, the UE 115-a may receive the SIB1 235 and proceed with a SIB1 decryption 245 using the unicast key derived from the AS security setup 210.

In some cases, however, while portions of the PBCH 230 (e.g., MIB contents excluding SFN) and the SIB1 235 may be encrypted and therefore protected against unauthorized devices, the PSS 220, the SSS 225, and the SFN may be used by the UE 115-a to identify the presence of the hidden network, and as such may allow un-authorized UEs 115 to also detect the presence of the hidden network. In some private network deployments, it may be advantageous to hide the presence of the network itself in addition to the information carried by the private network.

According to the techniques described herein, the private cell 205 may refrain from transmitting the SSB 215 message to the UE 115-a. As such, the UE 115-a may detect the presence of the hidden network associated with the private cell 205 via receiving one or more SSB parameters from a public cell (not illustrated in FIG. 2) that may be associated with the private cell 205. For example, the UE 115-a may be provisioned (e.g., preconfigured) with an identification of a public cell within the geographic area of the private cell 205. The UE 115-a may receive one or more SSB parameters that may include timing synchronization information and one or more SSB parameters.

In some cases, the UE 115-a may be preconfigured by the hidden network with one or more functions that may use the one or more SSB 215 received form the public cell to access a first private cell of the hidden network. For example, the UE 115-a may input the timing synchronization information from the public cell into a first function to determine a time offset of the private cell 205 relative to the public cell and may input the one or more SSB parameters of the public cell into a second function to determine one or more SSB parameters of the private cell 205. As such, the UE 115-a may use the derived time offset and the one or more SSB parameters of the private cell of the hidden network to determine CORESET0 240 position of the private cell 205. Further discussion of determining the CORESET0 240 position based on inputting SSB 215 from a public cell are described herein, including with reference to FIG. 3A.

As such, the UE 115-a may use the determined CORESET0 240 position to receive the SIB1 235 from the private cell 205. In some examples, the UE 115-a may decrypt the SIB1 235 message using one or more encryption keys. For example, the UE 115-a may use a long term key provisioned at the UE to derive a broadcast root key. In some examples, the UE 115-a may use the broadcast root key in part to derive a cell specific broadcast key associated with the private cell 205. As such, the UE 115-a may use the derived cell specific broadcast key to decrypt the SIB1 235 message from the private cell 205. Further discussion of decrypting the SIB1 235 message from the private cell 205 is described herein, including with reference to FIG. 3B.

FIGS. 3A and 3B illustrate examples of a wireless communications system 300 that supports cell access for hiding network presence and operation in accordance with aspects of the present disclosure. The wireless communication system 300 may implement or be implemented by one or more aspects of the wireless communications system 100 and wireless communications system 200. For example, the wireless communications system 300 may include a UE 115-b which may be an example of a UE 115 with reference to FIG. 1. The wireless communications system 300 may also include private cells 305-a, 305-b, and 305-c, and a public cell 310 which may be respective examples of cells supported by one or more base stations 105, as described with reference to FIG. 1. In some examples, the UE 115-b, the private cells 305, and the public cell 310 may operate in accordance with enhanced security implementations. Specifically, the UE 115-*b* may utilize a set of one or more functions to determine one or more sets of control resources to use for communication with one or more private cells 305. As such, the private cells 305 may refrain from transmitting one or more synchronization messages OTA to minimize detection of a private network associated with the UE 115-*b* and the private cells 305. It may be noted that, while examples are discussed below, any number of devices and device types may support the techniques described in the present disclosure.

As illustrated with reference to FIG. 3A, the private cells 305 may be located and positioned within a coverage area of the public cell 310. If a UE 115 is authorized by the private network associated with the private cells 305 (e.g., the UE 115-*b*) the UE 115-*b* may be provisioned with information associated with the public cell 310 for initial access. As such, based on the provisioned information, the UE 115-*b* may perform a cell search procedure to find the predefined public cell 310. In some examples, the UE 115-*b* may be provisioned with multiple public cells 310 and based on the results of a cell search may synchronize with a public cell 310 (e.g., a public cell 310 with the highest associated signal strength). As such, the UE 115-*b* may receive from the public cell 310 one or more synchronization signals in the form of an SSB 315. In some examples, the UE 115-*b* may receive a PCI 365 associated with public cell 310 from the synchronization signals and may further decode a PBCH 325 associated with the SSB 315 to obtain an SFN associated with the public cell 310.

In some examples, the SSB 315 may include a PSS 320, the PBCH 325, and an SSS 330 which may include public cell information 335 and one or more SSB parameters 340 associated with the public cell 310. As such, the UE 115-*b* may utilize multiple functions 345 provisioned at the UE 115-*b* to derive one or more control resource sets (e.g., a CORESET0 360) associated with the one or more private cells 305 as a process for receiving system information associated with each respective private cell 305. For example, the UE 115-*b* may input the public cell information 335 into a first function 345-*a* (e.g., f1) associated with the private cell 305-*a* to derive an offset time 350 (e.g., Offset$_{time}$) of the private cell 305-*a* relative to the public cell 310 (e.g., Offset$_{time}$=f1 (public cell information 335) mod (number of OFDM symbols in 1024 system frames)). Additionally, the UE 115-*b* may input the SSB parameters 340 and a private cell 305 search count (e.g., P$_{Cell\_Count}$) into a second function 345-*b* (e.g., f2) associated with the private cell 205-*a* to derive virtual SSB parameters 355 of the private cell 305-*a* (e.g., virtual SSB parameters 355=f2 (SSB parameters 340, P$_{Cell\_Count}$). As such, the UE 115-*b* may determine CORESET0 360 associated with the private cell 305-*a* by using the derived offset time 350 and the virtual SSB parameters 355. In some examples, the UE 115-*b* may use CORESET0 360 to monitor for encrypted system information from the private cell 305-*a*. The UE 115-*b* may also determine CORESET0 360 for each of the private cells 305 by deriving respective offset times 350 and virtual SSB parameters 355 using one or more functions 345 associated with each of the private cells 305.

As illustrated in FIG. 3B, the UE 115-*b* may use the CORESET0 360 associated with the private cell 305-*a* to receive encrypted system information (e.g., a SIB1 390 message) from the private cell 305-*a*. In some examples, the UE 115-*b* may derive a cell specific broadcast key 385 (e.g., K$_{B-Cell}$) associated with the private cell 305-*a* to proceed with a SIB1 decryption 395. In some examples, the UE 115-*b* may derive the cell specific broadcast key 385 associated with the private cell 305-*a* using a function 345-*c* (e.g., f3). For example, the derived SSB parameters 340 associated with the public cell 310 may include a PCI 365 value and an absolute radio-frequency channel number (ARFCN) 370 value which the UE 115-*b* may input into the function 345-*c* (e.g., f3) to determine a private cell ID 375 associated with the private cell 305-*a* (e.g., private cell ID 375=f3 (PCI 365|ARFCN 370)).

In some examples, the UE 115-*b* may use the private cell ID 375 and a broadcast root key 380 (e.g., K$_{B-Root}$) to determine the cell specific broadcast key 385. In some examples, the UE 115-*b* may determine the broadcast root key 380 based on a long term key (e.g., K) provisioned at the UE 115-*b* by the private network and inputting the long term key into a first KDF (e.g., K$_{B-Root}$=KDF (K)). As such, the UE 115-*b* may determine the cell specific broadcast key 385 associated with the private cell 305-*a* by inputting the derived private cell ID 375 and the broadcast root key 380 into a second KDF (e.g., K$_{B-Cell}$=KDF (K$_{B-Root}$, private cell ID 375)). In some cases, the UE 115-*b* may receive the SIB1 390 message from the private cell 305-*a* and decrypt the SIB1 390 message using the derived cell specific broadcast key 385 and an SFN included in the SSB parameters 340 from the public cell 310.

In some examples, the UE 115-*b* may repeat SIB1 decryption 395 procedures for each of the private cells 305 associated with the public cell 310 and select a private cell 305 or the one or more private cells 305 based on one or more measurement results associated with each respective SIB1 390 message. For example, as illustrated in FIG. 3B, the UE 115-*b* may determine from the one or more measurement results to proceed with a random access procedure with the private cell 305-*a*. As such, the UE 115-*b* may initiate random access procedures with the private cell 305-*a*.

Based on the UE 115-*b* deriving the virtual SSB parameters 355 associated with the private cell 305-*a*, the private cell 305-*a* may refrain from transmitting an SSB 315 OTA. As such, the private network associated with the UE 115-*b* and the private cells 305 may mitigate detection of the private network from unauthorized wireless devices by decreasing the number of unprotected messages broadcasted.

FIG. 4 illustrates an example of a process flow 400 that supports cell access for hiding network presence and operation in accordance with aspects of the present disclosure. In some examples, process flow 400 may implement aspects of the wireless communications system 100, the wireless communications system 200, the wireless communications system 300, or a combination thereof. The process flow 400 includes UE 115-*c* which may be an example of a UE 115 with reference to FIG. 1. The process flow 400 may also include a private cell 405-*a* and a public cell 410 which may be respective examples of a base station 105 as described with reference to FIG. 1. Alternative examples of the following may be implemented, where some steps are performed in a different order than described or are not performed at all. In some cases, steps may include additional features not mentioned below, or further steps may be added. In addition, while process flow 400 shows processes between a UE 115-*c*, a private cell 405-*a*, and a public cell 410, it should be understood that these processes may occur between any number of network devices.

At 415, the UE 115-*c* and the private cell 405-*a* may receive one or more synchronization messages from the public cell 410 that may indicate synchronization information associated with the public cell 410. For example, the UE 115-*c* and the private cell 405-*a* may receive in the synchronization messages a PCI, a PBCH, and an SFN associated with the public cell 410. In some examples, synchronization information may include timing synchronization information and a set of one or more SSB parameters such that the SSB parameters are received via an SSB from the public cell 410 which may include a PSS, an SSS, a PBCH, or a combination thereof. In some examples, the UE 115-c and the private cell 405-a may receive the one or more synchronization messages during different transmission time intervals. In some examples, the UE 115-c may be preconfigured with network information indicating that the public cell 410 is associated with the private cell 405-a.

At 420, the private cell 405-a may configure a set of control resources (e.g., a CORESET0) based on receiving the one or more synchronization messages from the public cell 410, such that the set of control resources may be determined by inputting the synchronization information associated with the public cell 410 into one or more functions associated with the private cell 405-a. For example, the private cell 405-a may input the timing synchronization information from the public cell 410 into a first function which may output a time offset associated with the private cell 405-a relative to the public cell 410. Additionally, the private cell 405-a may input the one or more SSB parameters associated with the public cell 410 into a second function which may output one or more virtual SSB parameters associated with the private cell 405-a. As such, the private cell 405-a may configure the set of control resources based on the time offset and the one or more virtual SSB parameters.

At 425, the UE 115-c may derive the set of control resources associated with private cell 405-a (e.g., the CORESET0) and receive system information associated with the private cell 405-a such that the set of control resources associated with the private cell 405-a may be determined by using at least a portion of the synchronization information associated with the public cell 410 as input for one or more functions associated with the private cell 405-a. For example, the UE 115-c may input the timing synchronization information from the public cell 410 into a first function that may output a time offset associated with the private cell 405-a relative to the public cell 410. Additionally, the UE 115-c may input the one or more SSB parameters associated with the public cell 410 into a second function that may output one or more virtual SSB parameters associated with the private cell 405-a. As such, the UE 115-c may derive and monitor the set of control resources associated with the private cell 405-a based on the time offset and the one or more SSB parameters associated with the public cell 410.

In some examples, the private cell 405-a may be one private cell 405 of a group of one or more private cells 405 (not illustrated in FIG. 4). In such examples, the UE 115-c may monitor multiple sets of control resources associated with the group of one or more private cells 405, such that each of the multiple sets of control resources may be associated with a respective private cell 405 of the group of one or more private cells 405 and the multiple sets of control resources may be based on the synchronization information associated with the public cell 410 being input to one or more respective functions corresponding to the respective private cell 405 of the group of one or more private cells 405.

At 430, the UE 115-c may derive a broadcast root key (e.g., $K_{B-Root}$ with reference to FIG. 3B) based on a long-term key provisioned at the UE 115-c (e.g., K with reference to FIG. 3B). In some cases, the UE 115-c may derive a cell specific broadcast key (e.g., $K_{B-Cell}$ with reference to FIG. 3B) associated with the private cell 405-a based on the broadcast root key and a cell ID of the private cell 405-a. In some cases, the cell ID of the private cell 405-a may be derived based on the PCI and an ARFCN of the public cell 410.

At 435, the private cell 405-a may transmit (e.g., via broadcast or unicast) to the UE 115-c system information (e.g., a SIB1 message) associated with the private cell 405-a using the configured set of control resources. At 440, the UE 115-c may receive and decrypt the system information from the private cell 405-a using the derived cell specific broadcast key. If the private cell 405-a is one cell of the group of private cells 405, the UE 115-c may decrypt and measure respective system information for each private cell 405 of the group of one or more private cells 405 and select the private cell 405-a from the group of one or more private cells 405 based on measuring the respective system information for each private cell 405-a. In some examples, the one or more functions used to derive the set of control resources and the cell specific broadcast key associated with the private cell 405-a may be preconfigured at the UE 115-c.

At 445, the UE 115-c may transmit, to the private cell 405-a using a set of resources associated with the private cell 405-a, a random access message indicating successful decryption of the system information, where the set of resources associated with the private cell 405-a may be based on the system information.

Figure 5:
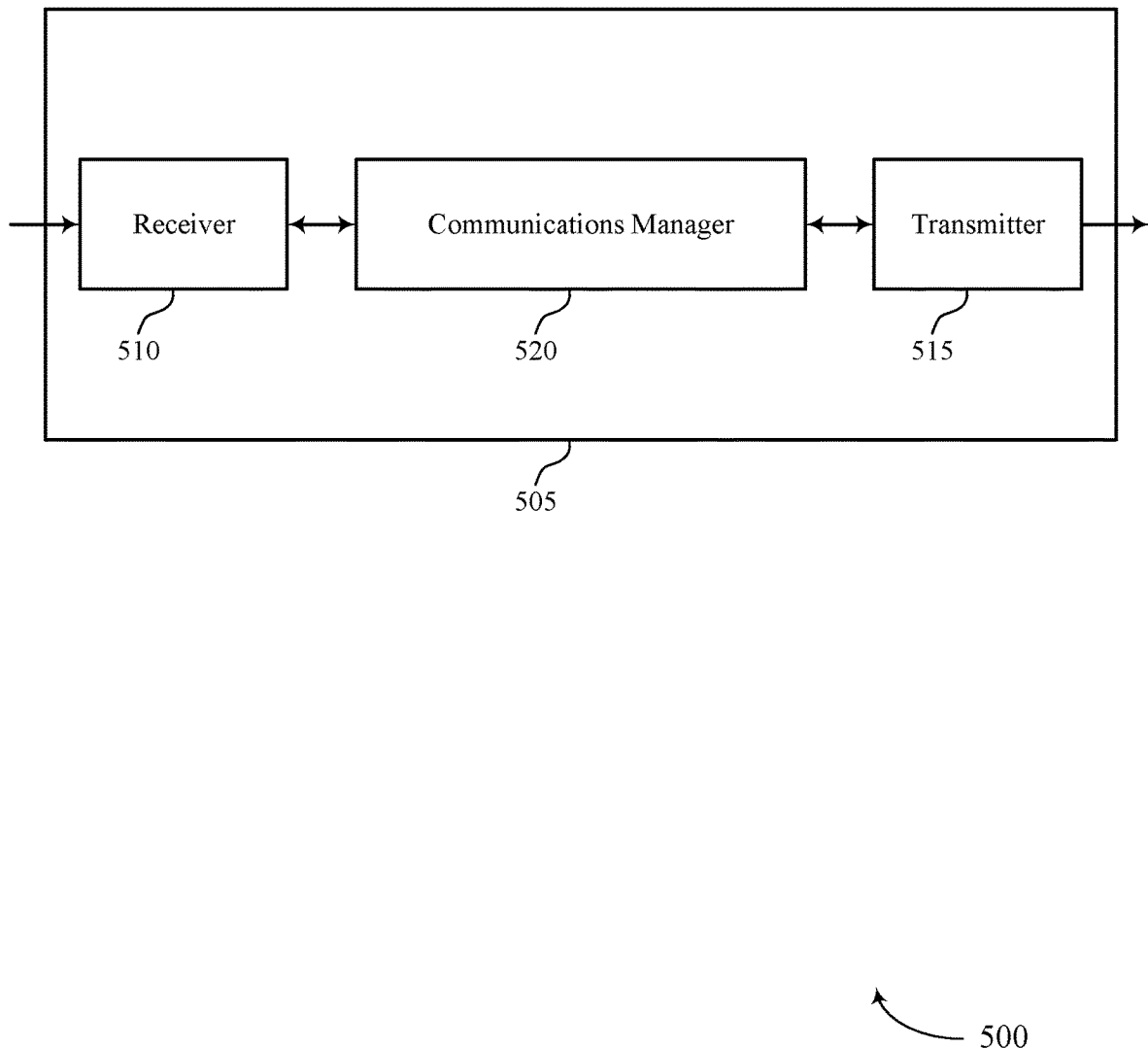
FIGS. 5 and 6 show block diagrams of devices that support cell access for hiding network presence and operation in accordance with aspects of the present disclosure.

FIG. 5 shows a block diagram 500 of a device 505 that supports cell access for hiding network presence and operation in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to cell access for hiding network presence and operation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to cell access for hiding network presence and operation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of cell access for hiding network presence and operation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving one or more synchronization messages from a first cell, the one or more synchronization messages indicating synchronization information associated with the first cell. The communications manager 520 may be configured as or otherwise support a means for monitoring a set of control resources associated with a second cell for system information associated with the second cell based on the one or more synchronization messages from the first cell, where the set of control resources associated with the second cell is determined by using at least a portion of the synchronization information associated with the first cell as input for one or more functions associated with the second cell. The communications manager 520 may be configured as or otherwise support a means for decoding the system information associated with the second cell based on monitoring the set of control resources.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing signaling overhead, more efficient utilization of communication resources, and mitigating private network presence to unauthorized wireless devices.

Figure 6:
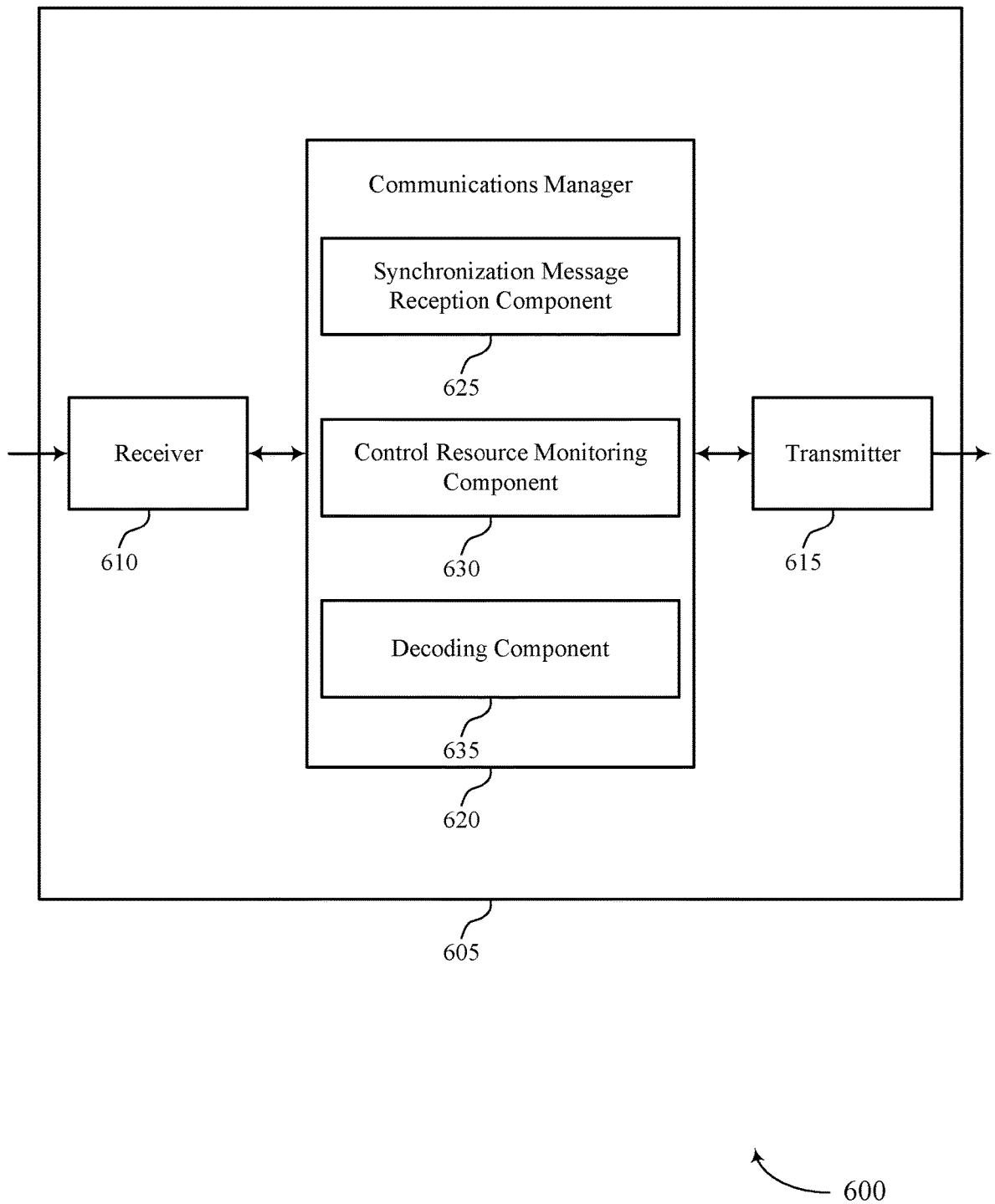

FIG. 6 shows a block diagram 600 of a device 605 that supports cell access for hiding network presence and operation in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to cell access for hiding network presence and operation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to cell access for hiding network presence and operation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of cell access for hiding network presence and operation as described herein. For example, the communications manager 620 may include a synchronization message reception component 625, a control resource monitoring component 630, a decoding component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The synchronization message reception component 625 may be configured as or otherwise support a means for receiving one or more synchronization messages from a first cell, the one or more synchronization messages indicating synchronization information associated with the first cell. The control resource monitoring component 630 may be configured as or otherwise support a means for monitoring a set of control resources associated with a second cell for system information associated with the second cell based on the one or more synchronization messages from the first cell, where the set of control resources associated with the second cell is determined by using at least a portion of the synchronization information associated with the first cell as input for one or more functions associated with the second cell. The decoding component 635 may be configured as or otherwise support a means for decoding the system information associated with the second cell based on monitoring the set of control resources.

Figure 7:
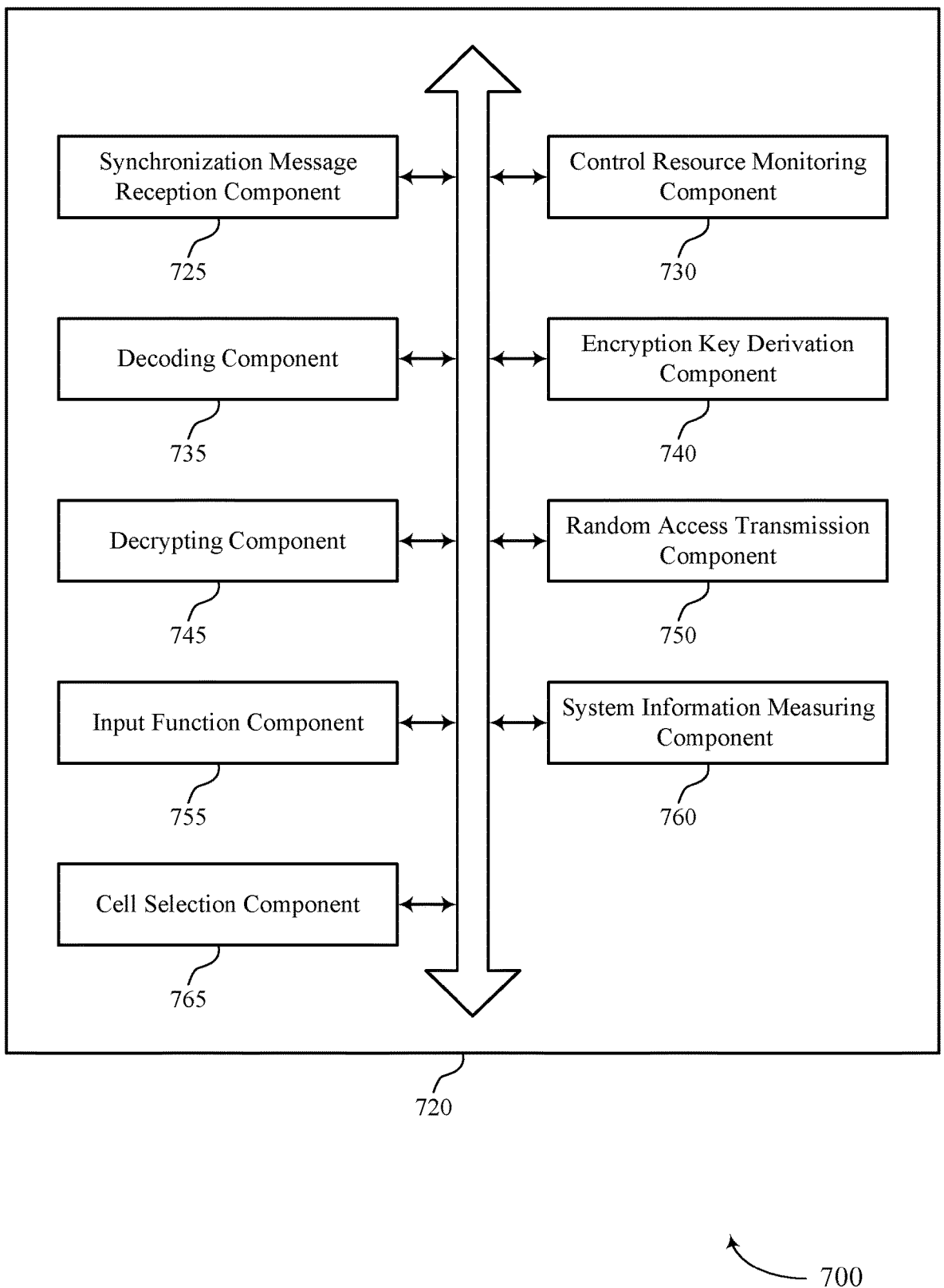
FIG. 7 shows a block diagram of a communications manager that supports cell access for hiding network presence and operation in accordance with aspects of the present disclosure.

FIG. 7 shows a block diagram 700 of a communications manager 720 that supports cell access for hiding network presence and operation in accordance with aspects of the present disclosure. The communications manager 720 may be an example of aspects of a communications manager 520, a communications manager 620, or both, as described herein. The communications manager 720, or various components thereof, may be an example of means for performing various aspects of cell access for hiding network presence and operation as described herein. For example, the communications manager 720 may include a synchronization message reception component 725, a control resource monitoring component 730, a decoding component 735, an encryption key derivation component 740, a decrypting component 745, a random access transmission component 750, an input function component 755, a system information measuring component 760, a cell selection component 765, or any combination thereof. Each of these components may communicate, directly or indirectly, with one another (e.g., via one or more buses).

The communications manager 720 may support wireless communications at a UE in accordance with examples as disclosed herein. The synchronization message reception component 725 may be configured as or otherwise support a means for receiving one or more synchronization messages from a first cell, the one or more synchronization messages indicating synchronization information associated with the first cell. The control resource monitoring component 730 may be configured as or otherwise support a means for monitoring a set of control resources associated with a second cell for system information associated with the second cell based on the one or more synchronization messages from the first cell, where the set of control resources associated with the second cell is determined by using at least a portion of the synchronization information associated with the first cell as input for one or more functions associated with the second cell. The decoding component 735 may be configured as or otherwise support a means for decoding the system information associated with the second cell based on monitoring the set of control resources.

In some examples, the encryption key derivation component 740 may be configured as or otherwise support a means for deriving broadcast root key based on a long term key. In some examples, the encryption key derivation component 740 may be configured as or otherwise support a means for deriving a cell specific broadcast key associated with the second cell based on the broadcast root key and a cell identifier of the second cell, the cell identifier of the second cell based on an identifier of the first cell and a channel number of the first cell. In some examples, the decrypting component 745 may be configured as or otherwise support a means for decrypting the system information associated with the second cell based on the cell specific broadcast key.

In some examples, the random access transmission component 750 may be configured as or otherwise support a means for transmitting, to the second cell and using a set of resources associated with the second cell, a random access message indicating successful decryption of the system information, the set of resources associated with the second cell based on the system information.

In some examples, to support receiving the one or more synchronization messages indicating the synchronization information associated with the first cell, the synchronization message reception component 725 may be configured as or otherwise support a means for receiving, from the first cell, timing synchronization information and one or more synchronization signal block parameters associated with the first cell.

In some examples, to support receiving the one or more synchronization signal block parameters, the synchronization message reception component 725 may be configured as or otherwise support a means for receiving a primary synchronization signal, a secondary synchronization signal, or a physical broadcast radio channel associated with the first cell, where the one or more synchronization signal block parameters is based on the primary synchronization signal, the secondary synchronization signal, or the physical broadcast radio channel associated with the first cell.

In some examples, the input function component 755 may be configured as or otherwise support a means for inputting the timing synchronization information into a first function of the one or more functions associated with the second cell, where an output of the first function includes a time offset associated with the second cell relative to the first cell. In some examples, the input function component 755 may be configured as or otherwise support a means for inputting the one or more synchronization signal block parameters associated with the first cell into a second function of the one or more functions associated with the second cell, where an output of the second function includes one or more synchronization signal block parameters associated with the second cell. In some examples, the control resource monitoring component 730 may be configured as or otherwise support a means for monitoring the set of control resources associated with the second cell based on the time offset and the one or more synchronization signal block parameters associated with the second cell.

In some examples, the second cell is one cell of a group of one or more cells.

In some examples, to support monitoring the set of control resources, the control resource monitoring component 730 may be configured as or otherwise support a means for monitoring multiple sets of control resources associated with the group of one or more cells, where each of the multiple sets of control resources associated with a respective cell of the group of one or more cells, and where each of the multiple sets of control resources is based on the synchronization information associated with the first cell being input to one or more respective functions corresponding to the respective cell of the group of one or more cells.

In some examples, the system information measuring component 760 may be configured as or otherwise support a means for measuring respective system information for each cell of the group of one or more cells. In some examples, the cell selection component 765 may be configured as or otherwise support a means for selecting the first cell from the group of one or more cells based on measuring the respective system information for each cell. In some examples, the random access transmission component 750 may be configured as or otherwise support a means for transmitting, to the first cell, a random access message indicating successful decrypting of system information received from the first cell.

In some examples, to support monitoring the set of control resources, the synchronization message reception component 725 may be configured as or otherwise support a means for receiving, from the first cell, the one or more synchronization messages including a public cell identity associated with the first cell, a physical broadcast channel associated with the first cell, and a system frame number associated with the first cell.

In some examples, the UE is preconfigured with network information indicating that the first cell is associated with the second cell.

In some examples, the one or more functions associated with the second cell are preconfigured at the UE.

Figure 8:
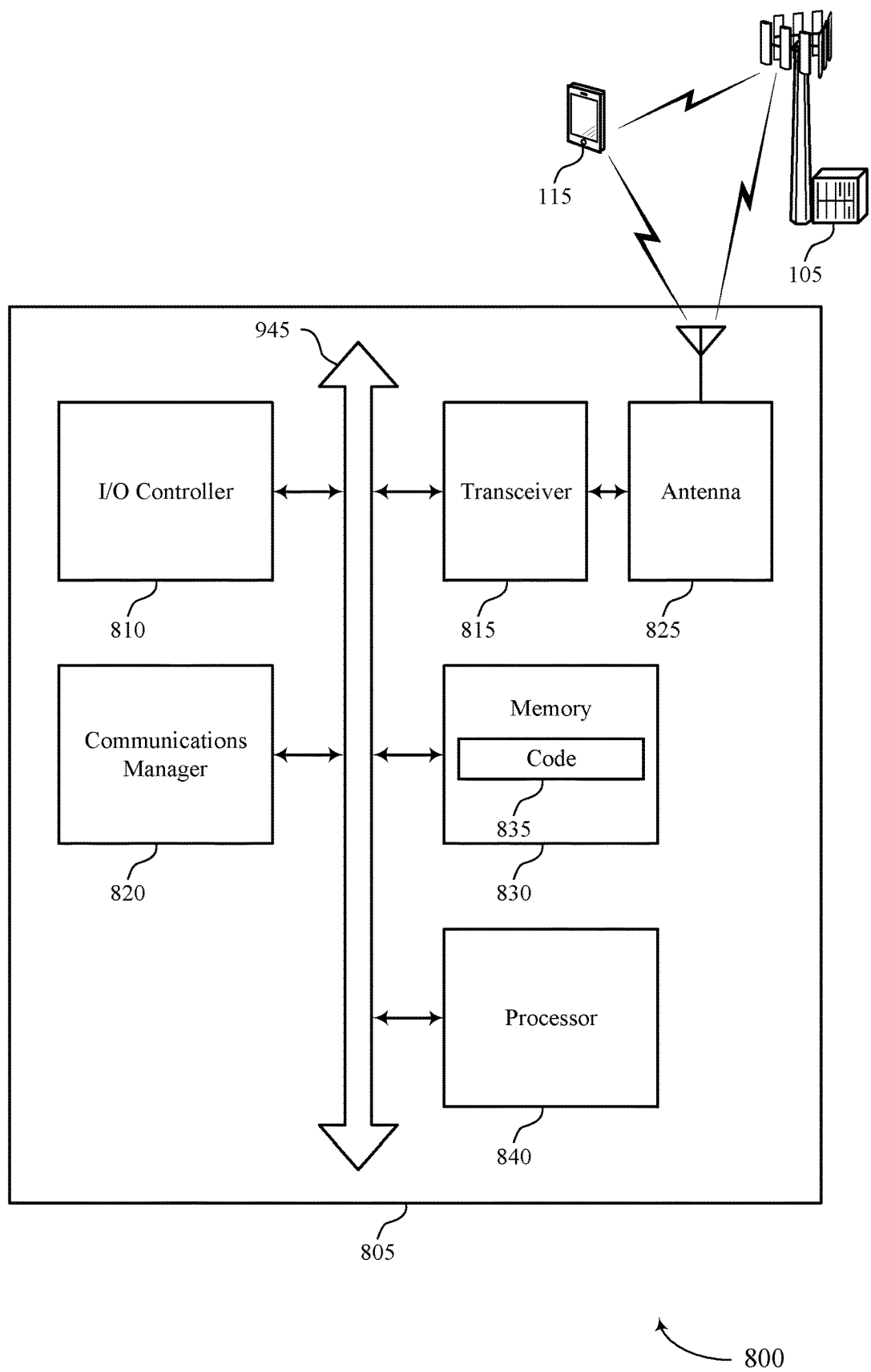
FIG. 8 shows a diagram of a system including a device that supports cell access for hiding network presence and operation in accordance with aspects of the present disclosure.

FIG. 8 shows a diagram of a system 800 including a device 805 that supports cell access for hiding network presence and operation in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting cell access for hiding network presence and operation). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving one or more synchronization messages from a first cell, the one or more synchronization messages indicating synchronization information associated with the first cell. The communications manager 820 may be configured as or otherwise support a means for monitoring a set of control resources associated with a second cell for system information associated with the second cell based on the one or more synchronization messages from the first cell, where the set of control resources associated with the second cell is determined by using at least a portion of the synchronization information associated with the first cell as input for one or more functions associated with the second cell. The communications manager 820 may be configured as or otherwise support a means for decoding the system information associated with the second cell based on monitoring the set of control resources.

By including or configuring the communications manager 820 in accordance with examples as described herein, the device 805 may support techniques for reducing signaling overhead, more efficient utilization of communication resources, mitigating private network presence to unauthorized wireless devices, improved coordination between wireless devices, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of cell access for hiding network presence and operation as described herein, or the processor 840 and the memory 830 may be otherwise configured to perform or support such operations.

Figure 9:
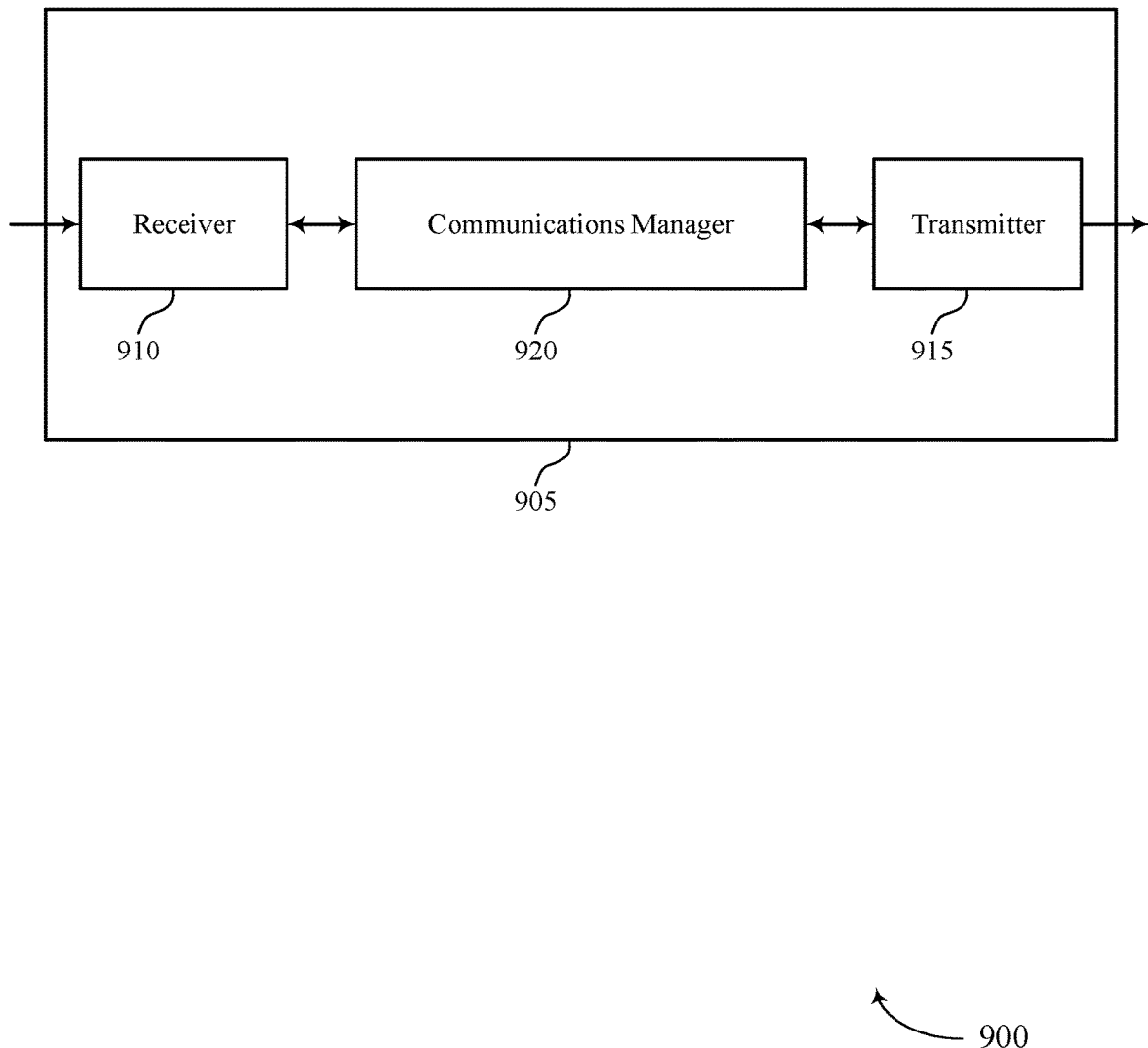
FIGS. 9 and 10 show block diagrams of devices that support cell access for hiding network presence and operation in accordance with aspects of the present disclosure.

FIG. 9 shows a block diagram 900 of a device 905 that supports cell access for hiding network presence and operation in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to cell access for hiding network presence and operation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to cell access for hiding network presence and operation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of cell access for hiding network presence and operation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a second cell in accordance with examples as disclosed herein. For example, the communications manager 920 may be configured as or otherwise support a means for receiving one or more synchronization messages from a first cell, the one or more synchronization messages indicating synchronization information associated with the first cell. The communications manager 920 may be configured as or otherwise support a means for configuring a set of control resources associated with the second cell for system information associated with the first cell based on receiving the one or more synchronization messages from the first cell, where the set of control resources associated with the second cell is determined by inputting the synchronization information associated with the first cell into one or more functions associated with the second cell. The communications manager 920 may be configured as or otherwise support a means for transmitting the system information associated with the second cell via the set of control resources.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reducing signaling overhead, more efficient utilization of communication resources, mitigating private network presence to unauthorized wireless devices, improved coordination between wireless devices, and improved utilization of processing capability.

Figure 10:
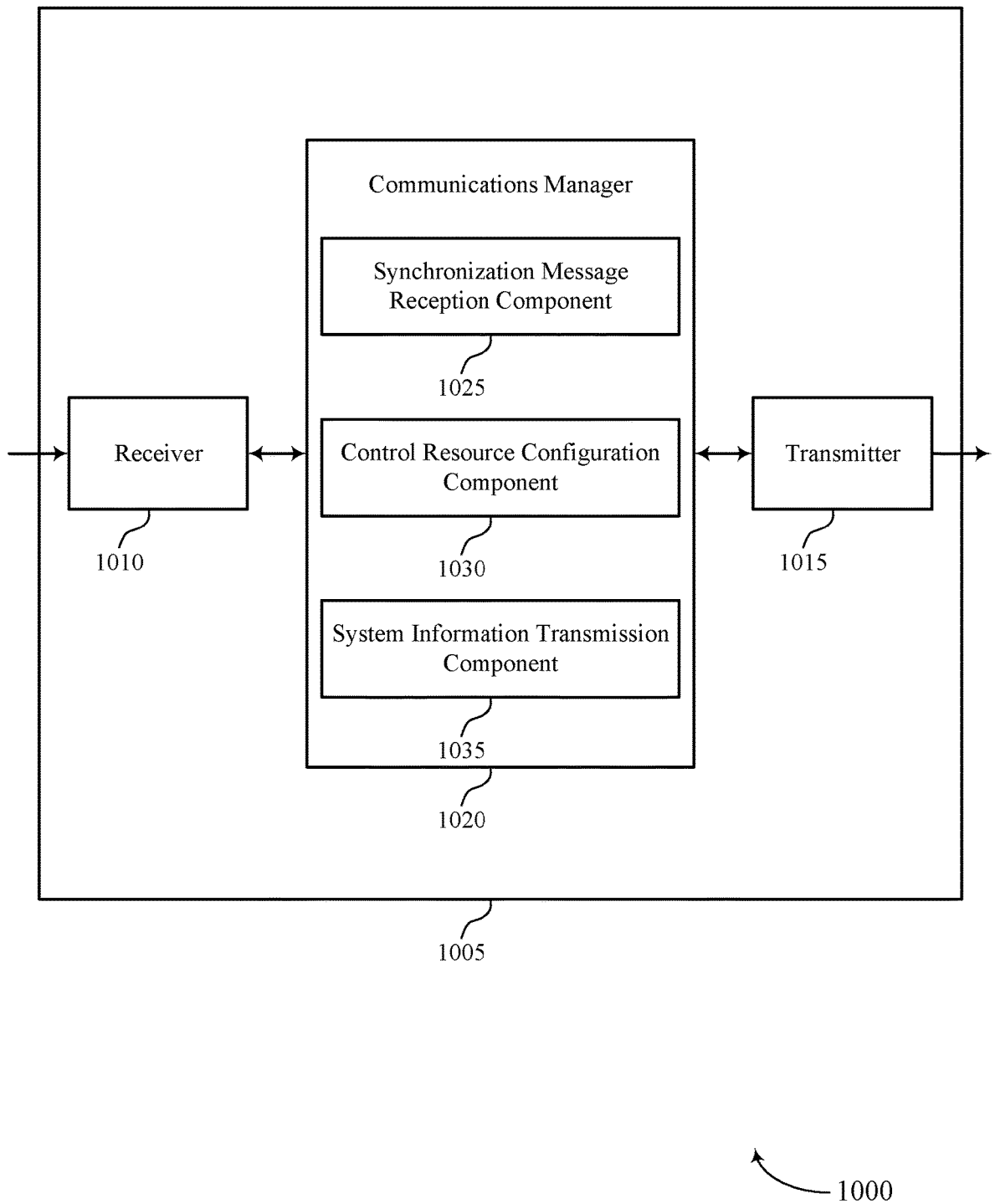

FIG. 10 shows a block diagram 1000 of a device 1005 that supports cell access for hiding network presence and operation in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to cell access for hiding network presence and operation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to cell access for hiding network presence and operation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of cell access for hiding network presence and operation as described herein. For example, the communications manager 1020 may include a synchronization message reception component 1025, a control resource configuration component 1030, a system information transmission component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a second cell in accordance with examples as disclosed herein. The synchronization message reception component 1025 may be configured as or otherwise support a means for receiving one or more synchronization messages from a first cell, the one or more synchronization messages indicating synchronization information associated with the first cell. The control resource configuration component 1030 may be configured as or otherwise support a means for configuring a set of control resources associated with the second cell for system information associated with the first cell based on receiving the one or more synchronization messages from the first cell, where the set of control resources associated with the second cell is determined by inputting the synchronization information associated with the first cell into one or more functions associated with the second cell. The system information transmission component 1035 may be configured as or otherwise support a means for transmitting the system information associated with the second cell via the set of control resources.

Figure 11:
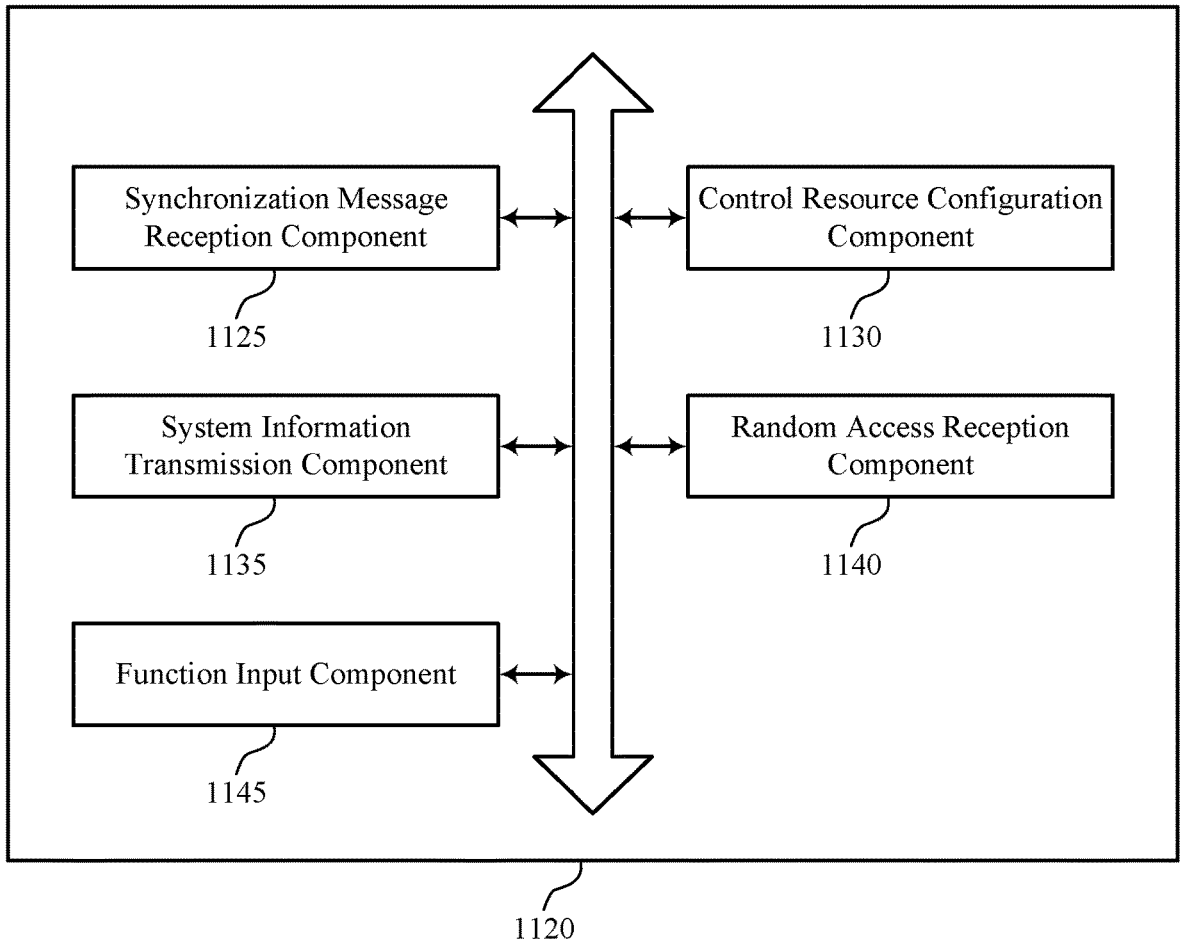
FIG. 11 shows a block diagram of a communications manager that supports cell access for hiding network presence and operation in accordance with aspects of the present disclosure.

FIG. 11 shows a block diagram 1100 of a communications manager 1120 that supports cell access for hiding network presence and operation in accordance with aspects of the present disclosure. The communications manager 1120 may be an example of aspects of a communications manager 920, a communications manager 1020, or both, as described herein. The communications manager 1120, or various components thereof, may be an example of means for performing various aspects of cell access for hiding network presence and operation as described herein. For example, the communications manager 1120 may include a synchronization message reception component 1125, a control resource configuration component 1130, a system information transmission component 1135, a random access reception component 1140, a function input component 1145, or any combination thereof. Each of these components may communicate, directly or indirectly, with one another (e.g., via one or more buses).

The communications manager 1120 may support wireless communications at a second cell in accordance with examples as disclosed herein. The synchronization message reception component 1125 may be configured as or otherwise support a means for receiving one or more synchronization messages from a first cell, the one or more synchronization messages indicating synchronization information associated with the first cell. The control resource configuration component 1130 may be configured as or otherwise support a means for configuring a set of control resources associated with the second cell for system information associated with the first cell based on receiving the one or more synchronization messages from the first cell, where the set of control resources associated with the second cell is determined by inputting the synchronization information associated with the first cell into one or more functions associated with the second cell. The system information transmission component 1135 may be configured as or otherwise support a means for transmitting the system information associated with the second cell via the set of control resources.

In some examples, the random access reception component 1140 may be configured as or otherwise support a means for receiving, from a UE, using a set of resources associated with the second cell, a random access message indicating successful decryption of the system information, the set of resources associated with the second cell based on the system information.

In some examples, to support receiving the one or more synchronization messages indicating the synchronization information associated with the second cell, the synchronization message reception component 1125 may be configured as or otherwise support a means for receiving, from the first cell, timing synchronization information and one or more synchronization signal block parameters associated with the first cell.

In some examples, to support receiving the one or more synchronization signal block parameters, the synchronization message reception component 1125 may be configured as or otherwise support a means for receiving a primary synchronization signal, a secondary synchronization signal, or a physical broadcast radio channel associated with the second cell, where the one or more synchronization signal block parameters is based on the primary synchronization signal, the secondary synchronization signal, or the physical broadcast radio channel associated with the second cell.

In some examples, the function input component 1145 may be configured as or otherwise support a means for inputting the timing synchronization information into a first function of the one or more functions associated with the second cell, where an output of the first function includes a time offset associated with the second cell relative to the first cell. In some examples, the function input component 1145 may be configured as or otherwise support a means for inputting the one or more synchronization signal block parameters associated with the first cell into a second function of the one or more functions associated with the second cell, where an output of the second function includes one or more synchronization signal block parameters associated with the second cell. In some examples, the control resource configuration component 1130 may be configured as or otherwise support a means for configuring the set of control resources associated with the second cell based on the time offset and the one or more synchronization signal block parameters associated with the second cell.

In some examples, the second cell is one cell of a group of one or more cells.

In some examples, the one or more functions associated with the second cell are preconfigured at the UE.

Figure 12:
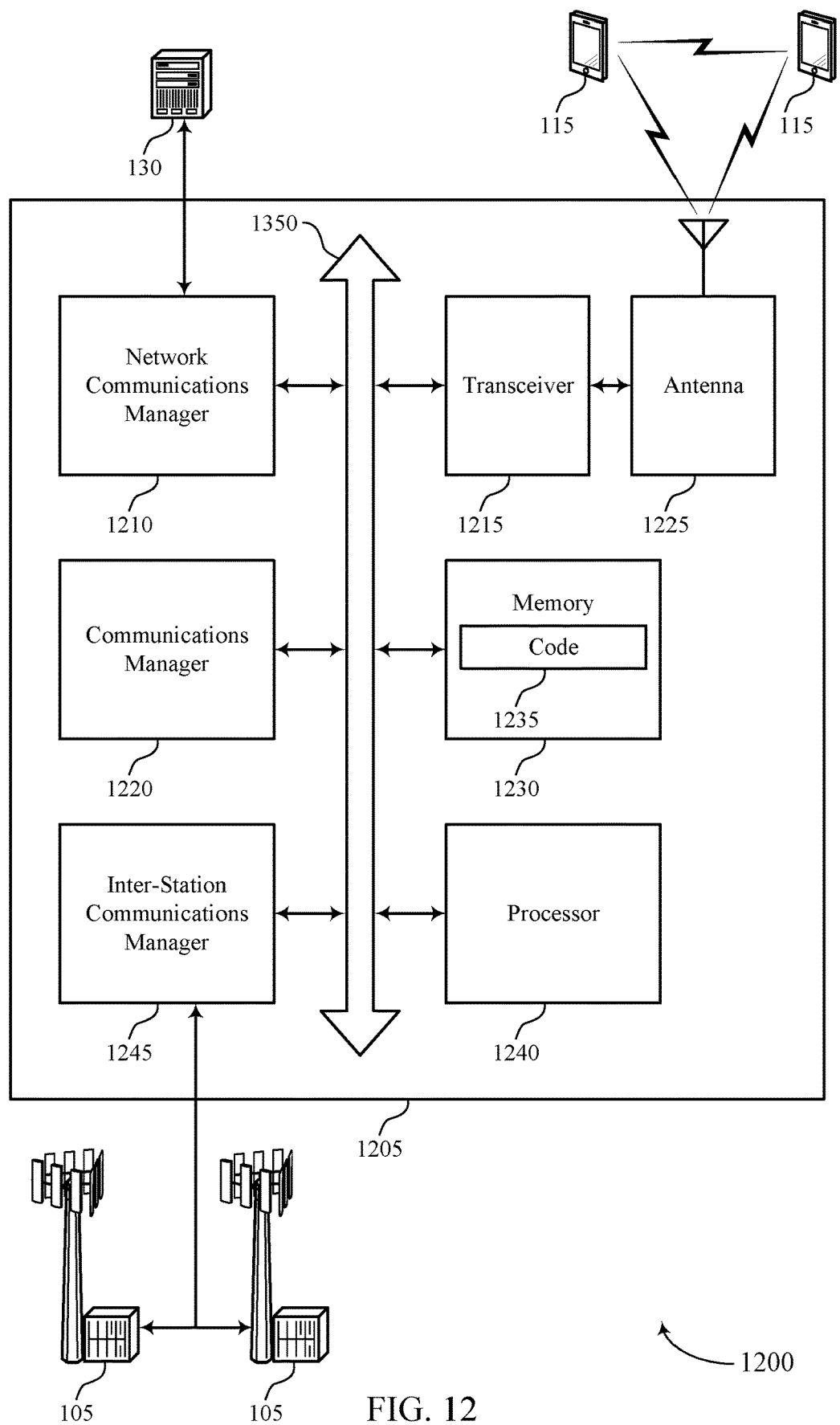
FIG. 12 shows a diagram of a system including a device that supports cell access for hiding network presence and operation in accordance with aspects of the present disclosure.

FIG. 12 shows a diagram of a system 1200 including a device 1205 that supports cell access for hiding network presence and operation in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting cell access for hiding network presence and operation). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a second cell in accordance with examples as disclosed herein. For example, the communications manager 1220 may be configured as or otherwise support a means for receiving one or more synchronization messages from a first cell, the one or more synchronization messages indicating synchronization information associated with the first cell. The communications manager 1220 may be configured as or otherwise support a means for configuring a set of control resources associated with the second cell for system information associated with the first cell based on receiving the one or more synchronization messages from the first cell, where the set of control resources associated with the second cell is determined by inputting the synchronization information associated with the first cell into one or more functions associated with the second cell. The communications manager 1220 may be configured as or otherwise support a means for transmitting the system information associated with the second cell via the set of control resources.

By including or configuring the communications manager 1220 in accordance with examples as described herein, the device 1205 may support techniques for reducing signaling overhead, more efficient utilization of communication resources, mitigating private network presence to unauthorized wireless devices, improved coordination between wireless devices, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of cell access for hiding network presence and operation as described herein, or the processor 1240 and the memory 1230 may be otherwise configured to perform or support such operations.

Figure 13:
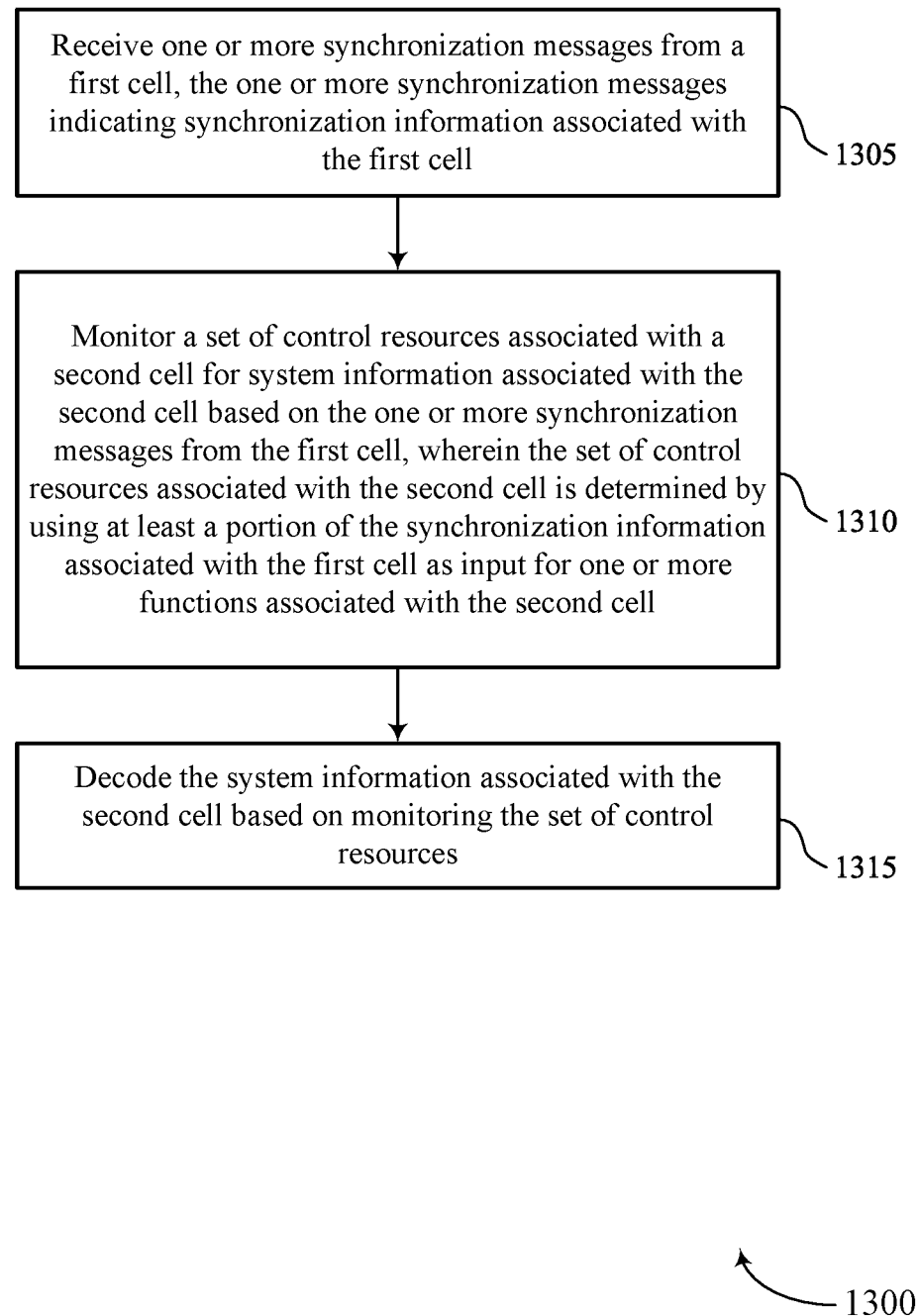
FIGS. 13 through 16 show flowcharts illustrating methods that support cell access for hiding network presence and operation in accordance with aspects of the present disclosure.

FIG. 13 shows a flowchart illustrating a method 1300 that supports cell access for hiding network presence and operation in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving one or more synchronization messages from a first cell, the one or more synchronization messages indicating synchronization information associated with the first cell. The operations of 1305 may be performed in accordance with examples as disclosed herein. In some examples, aspects of the operations of 1305 may be performed by a synchronization message reception component 725 as described with reference to FIG. 7.

At 1310, the method may include monitoring a set of control resources associated with a second cell for system information associated with the second cell based on the one or more synchronization messages from the first cell, where the set of control resources associated with the second cell is determined by using at least a portion of the synchronization information associated with the first cell as input for one or more functions associated with the second cell. The operations of 1310 may be performed in accordance with examples as disclosed herein. In some examples, aspects of the operations of 1310 may be performed by a control resource monitoring component 730 as described with reference to FIG. 7.

At 1315, the method may include decoding the system information associated with the second cell based on monitoring the set of control resources. The operations of 1315 may be performed in accordance with examples as disclosed herein. In some examples, aspects of the operations of 1315 may be performed by a decoding component 735 as described with reference to FIG. 7.

Figure 14:
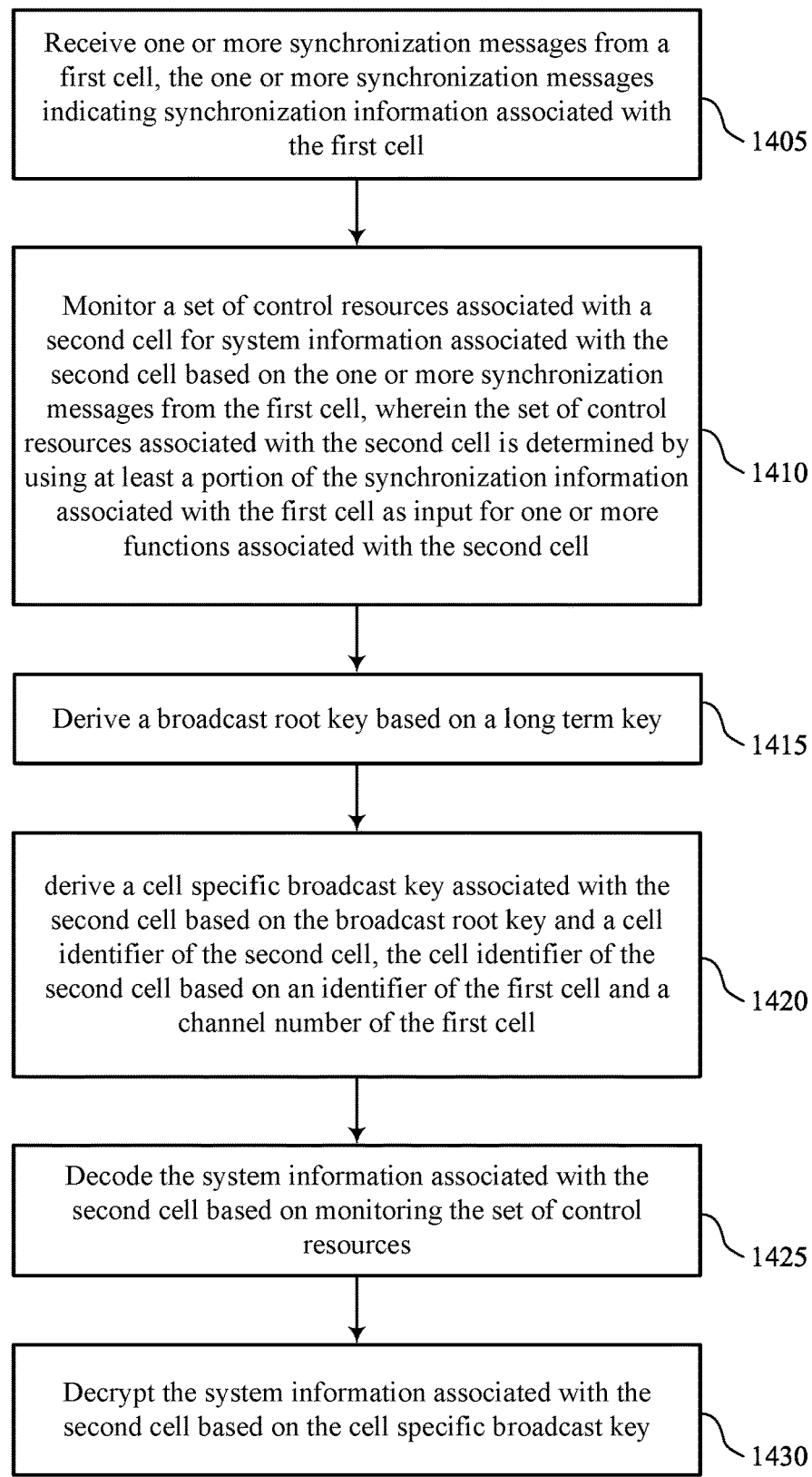

FIG. 14 shows a flowchart illustrating a method 1400 that supports cell access for hiding network presence and operation in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving one or more synchronization messages from a first cell, the one or more synchronization messages indicating synchronization information associated with the first cell. The operations of 1405 may be performed in accordance with examples as disclosed herein. In some examples, aspects of the operations of 1405 may be performed by a synchronization message reception component 725 as described with reference to FIG. 7.

At 1410, the method may include monitoring a set of control resources associated with a second cell for system information associated with the second cell based on the one or more synchronization messages from the first cell, where the set of control resources associated with the second cell is determined by using at least a portion of the synchronization information associated with the first cell as input for one or more functions associated with the second cell. The operations of 1410 may be performed in accordance with examples as disclosed herein. In some examples, aspects of the operations of 1410 may be performed by a control resource monitoring component 730 as described with reference to FIG. 7.

At 1415, the method may include deriving a broadcast root key based on a long term key. The operations of 1415 may be performed in accordance with examples as disclosed herein. In some examples, aspects of the operations of 1415 may be performed by an encryption key derivation component 740 as described with reference to FIG. 7.

At 1420, the method may include deriving a cell specific broadcast key associated with the second cell based on the broadcast root key and a cell identifier of the second cell, the cell identifier of the second cell based on an identifier of the first cell and a channel number of the first cell. The operations of 1420 may be performed in accordance with examples as disclosed herein. In some examples, aspects of the operations of 1420 may be performed by an encryption key derivation component 740 as described with reference to FIG. 7.

At 1425, the method may include decoding the system information associated with the second cell based on monitoring the set of control resources. The operations of 1425 may be performed in accordance with examples as disclosed herein. In some examples, aspects of the operations of 1425 may be performed by a decoding component 735 as described with reference to FIG. 7.

At 1430, the method may include decrypting the system information associated with the second cell based on the cell specific broadcast key. The operations of 1430 may be performed in accordance with examples as disclosed herein. In some examples, aspects of the operations of 1430 may be performed by a decrypting component 745 as described with reference to FIG. 7.

Figure 15:
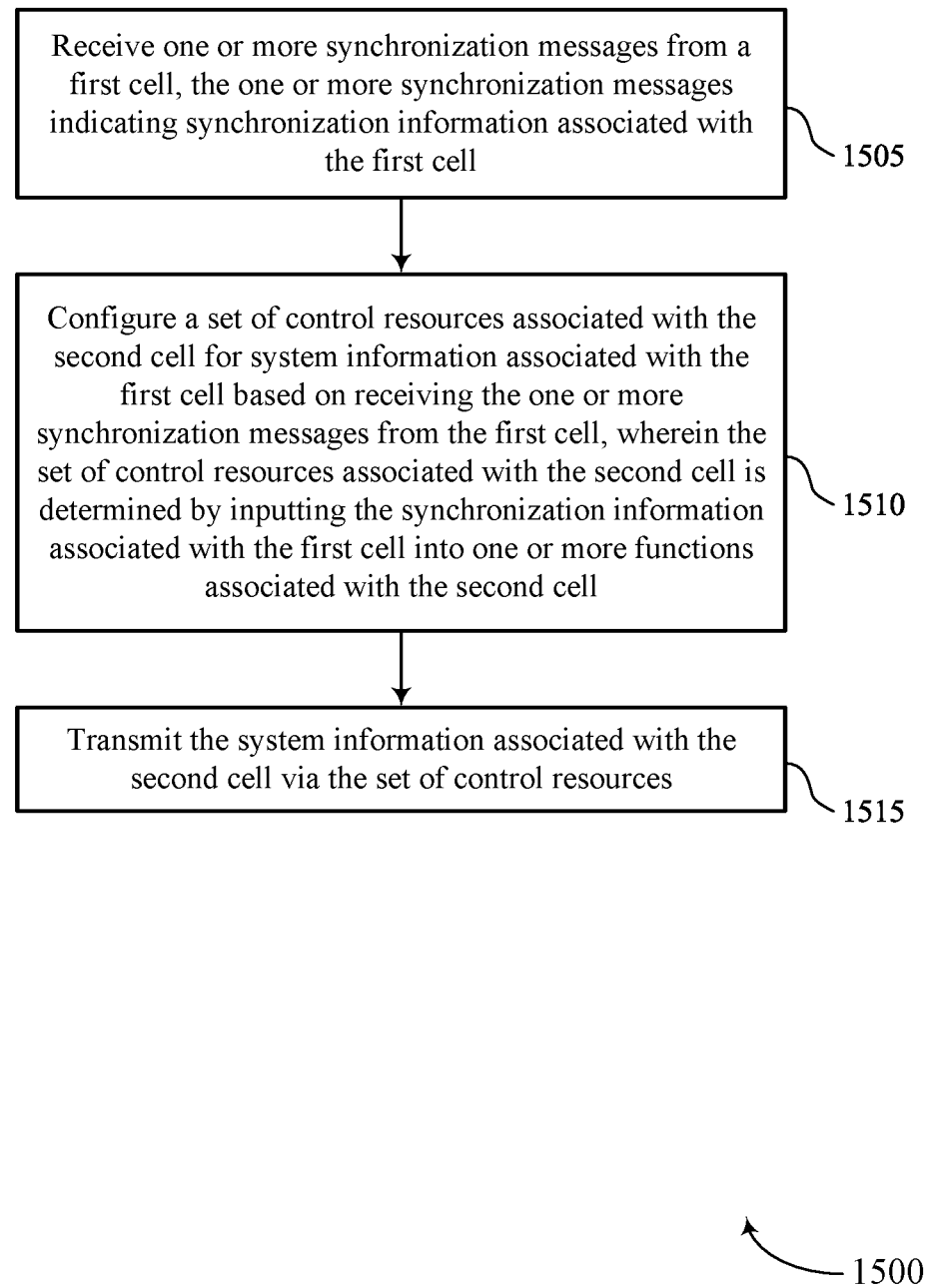

FIG. 15 shows a flowchart illustrating a method 1500 that supports cell access for hiding network presence and operation in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving one or more synchronization messages from a first cell, the one or more synchronization messages indicating synchronization information associated with the first cell. The operations of 1505 may be performed in accordance with examples as disclosed herein. In some examples, aspects of the operations of 1505 may be performed by a synchronization message reception component 1125 as described with reference to FIG. 11.

At 1510, the method may include configuring a set of control resources associated with the second cell for system information associated with the first cell based on receiving the one or more synchronization messages from the first cell, where the set of control resources associated with the second cell is determined by inputting the synchronization information associated with the first cell into one or more functions associated with the second cell. The operations of 1510 may be performed in accordance with examples as disclosed herein. In some examples, aspects of the operations of 1510 may be performed by a control resource configuration component 1130 as described with reference to FIG. 11.

At 1515, the method may include transmitting the system information associated with the second cell via the set of control resources. The operations of 1515 may be performed in accordance with examples as disclosed herein. In some examples, aspects of the operations of 1515 may be performed by a system information transmission component 1135 as described with reference to FIG. 11.

Figure 16:
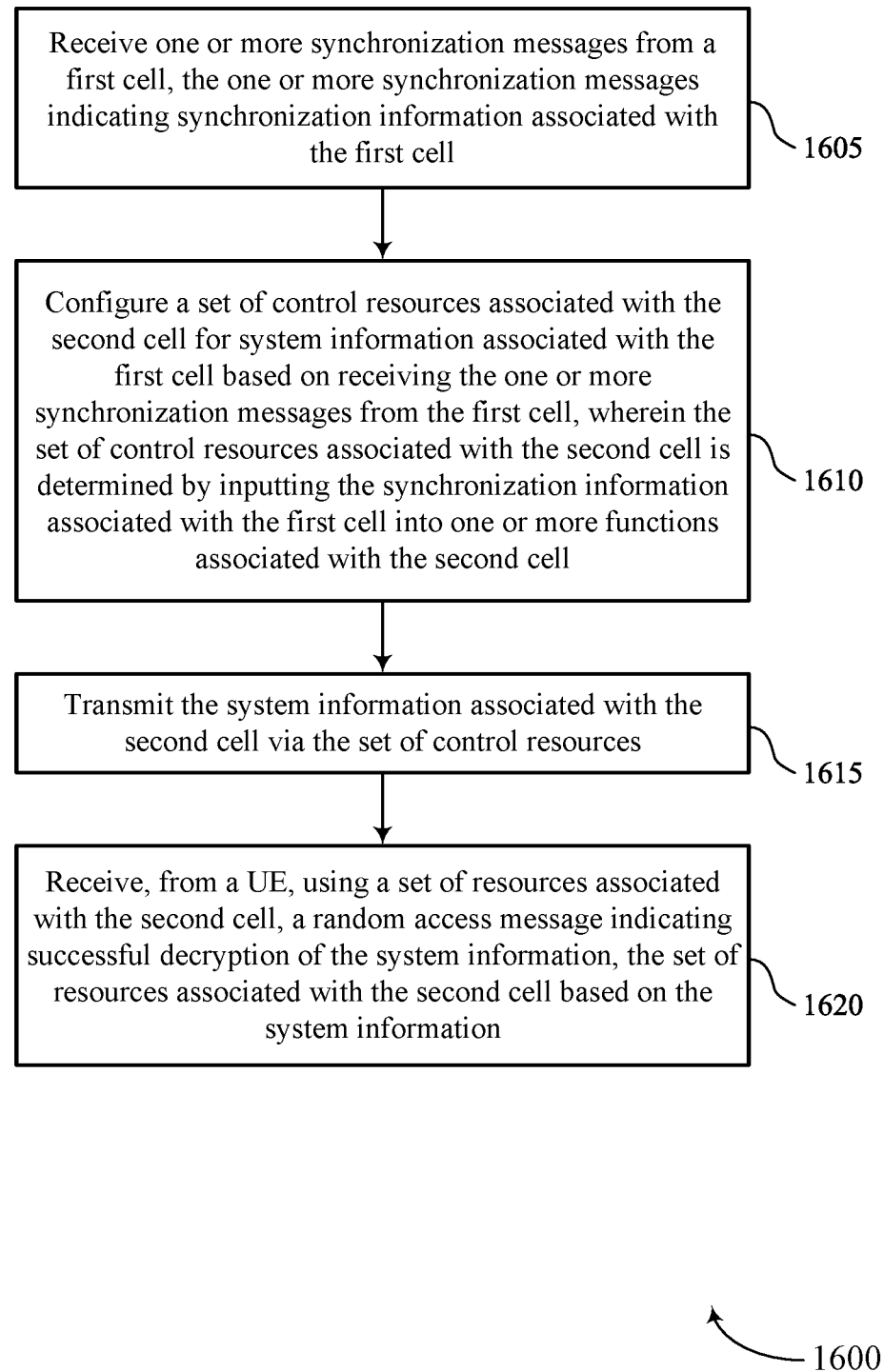

FIG. 16 shows a flowchart illustrating a method 1600 that supports cell access for hiding network presence and operation in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving one or more synchronization messages from a first cell, the one or more synchronization messages indicating synchronization information associated with the first cell. The operations of 1605 may be performed in accordance with examples as disclosed herein. In some examples, aspects of the operations of 1605 may be performed by a synchronization message reception component 1125 as described with reference to FIG. 11.

At 1610, the method may include configuring a set of control resources associated with the second cell for system information associated with the first cell based on receiving the one or more synchronization messages from the first cell, where the set of control resources associated with the second cell is determined by inputting the synchronization information associated with the first cell into one or more functions associated with the second cell. The operations of 1610 may be performed in accordance with examples as disclosed herein. In some examples, aspects of the operations of 1610 may be performed by a control resource configuration component 1130 as described with reference to FIG. 11.

At 1615, the method may include transmitting the system information associated with the second cell via the set of control resources. The operations of 1615 may be performed in accordance with examples as disclosed herein. In some examples, aspects of the operations of 1615 may be performed by a system information transmission component 1135 as described with reference to FIG. 11.

At 1620, the method may include receiving, from a UE, using a set of resources associated with the second cell, a random access message indicating successful decryption of the system information, the set of resources associated with the second cell based on the system information. The operations of 1620 may be performed in accordance with examples as disclosed herein. In some examples, aspects of the operations of 1620 may be performed by a random access reception component 1140 as described with reference to FIG. 11.

The following provides an overview of aspects of the present disclosure:

Aspect 1: A method for wireless communications at a UE, comprising: receiving one or more synchronization messages from a first cell, the one or more synchronization messages indicating synchronization information associated with the first cell: monitoring a set of control resources associated with a second cell for system information associated with the second cell based on the one or more synchronization messages from the first cell, where the set of control resources associated with the second cell is determined by using at least a portion of the synchronization information associated with the first cell as input for one or more functions associated with the second cell; and decoding the system information associated with the second cell based on monitoring the set of control resources.

Aspect 2: The method of aspect 1, further comprising: deriving a broadcast root key based on a long term key: deriving a cell specific broadcast key associated with the second cell based on the broadcast root key and a cell identifier of the second cell, the cell identifier of the second cell based on an identifier of the first cell and a channel number of the first cell; and decrypting the system information associated with the second cell based on the cell specific broadcast key.

Aspect 3: The method of aspect 2, further comprising: transmitting, to the second cell and using a set of resources associated with the second cell, a random access message indicating successful decryption of the system information, the set of resources associated with the second cell based on the system information.

Aspect 4: The method of any of aspects 1 through 3, where receiving the one or more synchronization messages indicating the synchronization information associated with the first cell further comprises: receiving, from the first cell, timing synchronization information and one or more synchronization signal block parameters associated with the first cell.

Aspect 5: The method of aspect 4, where receiving the one or more synchronization signal block parameters comprises: receiving a primary synchronization signal, a secondary synchronization signal, or a physical broadcast radio channel associated with the first cell, where the one or more synchronization signal block parameters is based on the primary synchronization signal, the secondary synchronization signal, or the physical broadcast radio channel associated with the first cell.

Aspect 6: The method of any of aspects 4 through 5, further comprising: inputting the timing synchronization information into a first function of the one or more functions associated with the second cell, where an output of the first function comprises a time offset associated with the second cell relative to the first cell: inputting the one or more synchronization signal block parameters associated with the first cell into a second function of the one or more functions associated with the second cell, where an output of the second function comprises one or more synchronization signal block parameters associated with the second cell; and monitoring the set of control resources associated with the second cell based on the time offset and the one or more synchronization signal block parameters associated with the second cell.

Aspect 7: The method of any of aspects 1 through 6, where the second cell is one cell of a group of one or more cells.

Aspect 8: The method of aspect 7, where monitoring the set of control resources comprises: monitoring multiple sets of control resources associated with the group of one or more cells, where each of the multiple sets of control resources associated with a respective cell of the group of one or more cells, and where each of the multiple sets of control resources is based on the synchronization information associated with the first cell being input to one or more respective functions corresponding to the respective cell of the group of one or more cells.

Aspect 9: The method of aspect 8, further comprising: measuring respective system information for each cell of the group of one or more cells: selecting the first cell from the group of one or more cells based on measuring the respective system information for each cell; and transmitting, to the first cell, a random access message indicating successful decrypting of system information received from the first cell.

Aspect 10: The method of any of aspects 1 through 9, where monitoring the set of control resources comprises:

receiving, from the first cell, the one or more synchronization messages comprising a public cell identity associated with the first cell, a physical broadcast channel associated with the first cell, and a system frame number associated with the first cell.

Aspect 11: The method of aspect 10, where the UE is preconfigured with network information indicating that the first cell is associated with the second cell.

Aspect 12: The method of any of aspects 1 through 11, where the one or more functions associated with the second cell are preconfigured at the UE.

Aspect 13: A method for wireless communications at a second cell, comprising: receiving one or more synchronization messages from a first cell, the one or more synchronization messages indicating synchronization information associated with the first cell: configuring a set of control resources associated with the second cell for system information associated with the first cell based on receiving the one or more synchronization messages from the first cell, where the set of control resources associated with the second cell is determined by inputting the synchronization information associated with the first cell into one or more functions associated with the second cell; and transmitting the system information associated with the second cell via the set of control resources.

Aspect 14: The method of aspect 13, further comprising: receiving, from a UE, using a set of resources associated with the second cell, a random access message indicating successful decryption of the system information, the set of resources associated with the second cell based on the system information.

Aspect 15: The method of any of aspects 13 through 14, where receiving the one or more synchronization messages indicating the synchronization information associated with the second cell further comprises: receiving, from the first cell, timing synchronization information and one or more synchronization signal block parameters associated with the first cell.

Aspect 16: The method of aspect 15, where receiving the one or more synchronization signal block parameters comprises: receiving a primary synchronization signal, a secondary synchronization signal, or a physical broadcast radio channel associated with the second cell, where the one or more synchronization signal block parameters is based on the primary synchronization signal, the secondary synchronization signal, or the physical broadcast radio channel associated with the second cell.

Aspect 17: The method of any of aspects 15 through 16, further comprising: inputting the timing synchronization information into a first function of the one or more functions associated with the second cell, where an output of the first function comprises a time offset associated with the second cell relative to the first cell: inputting the one or more synchronization signal block parameters associated with the first cell into a second function of the one or more functions associated with the second cell, where an output of the second function comprises one or more synchronization signal block parameters associated with the second cell; and configuring the set of control resources associated with the second cell based on the time offset and the one or more synchronization signal block parameters associated with the second cell.

Aspect 18: The method of any of aspects 13 through 17, where the second cell is one cell of a group of one or more cells.

Aspect 19: The method of any of aspects 13 through 18, where the one or more functions associated with the second cell are preconfigured at the UE.

Aspect 20: An apparatus for wireless communications at a UE, comprising a processor: memory coupled with the processor; and instructions stored in the memory and executable by the processor to cause the apparatus to perform a method of any of aspects 1 through 12.

Aspect 21: An apparatus for wireless communications at a UE, comprising at least one means for performing a method of any of aspects 1 through 12.

Aspect 22: A non-transitory computer-readable medium storing code for wireless communications at a UE, the code comprising instructions executable by a processor to perform a method of any of aspects 1 through 12.

Aspect 23: An apparatus for wireless communications at a second cell, comprising a processor: memory coupled with the processor; and instructions stored in the memory and executable by the processor to cause the apparatus to perform a method of any of aspects 13 through 19.

Aspect 24: An apparatus for wireless communications at a second cell, comprising at least one means for performing a method of any of aspects 13 through 19.

Aspect 25: A non-transitory computer-readable medium storing code for wireless communications at a second cell, the code comprising instructions executable by a processor to perform a method of any of aspects 13 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving one or more synchronization messages from a first cell, the one or more synchronization messages indicating synchronization information associated with the first cell;
   deriving a broadcast root key based at least in part on a long term key;
   deriving a cell specific broadcast key associated with a second cell based at least in part on the broadcast root key and a cell identifier of the second cell, the cell identifier of the second cell based at least in part on an identifier of the first cell and a channel number of the first cell;
   monitoring a set of control resources associated with the second cell for system information associated with the second cell based at least in part on the one or more synchronization messages from the first cell, wherein the set of control resources associated with the second cell is determined by using at least a portion of the synchronization information associated with the first cell as input for one or more functions associated with the second cell; and
   obtaining, via the set of control resources associated with the second cell, the system information associated with the second cell based at least in part on the cell specific broadcast key.

2. The method of claim 1, wherein obtaining the system information associated with the second cell comprises:
   decrypting the system information associated with the second cell based at least in part on the cell specific broadcast key; and decoding the system information associated with the second cell based at least in part on monitoring the set of control resources.

3. The method of claim 2, further comprising:
transmitting, to the second cell and using a set of resources associated with the second cell, a random access message indicating successful decryption of the system information, the set of resources associated with the second cell based at least in part on the system information.

4. The method of claim 1, wherein receiving the one or more synchronization messages indicating the synchronization information associated with the first cell further comprises:
receiving, from the first cell, timing synchronization information and one or more synchronization signal block parameters associated with the first cell.

5. The method of claim 4, wherein receiving the one or more synchronization signal block parameters comprises:
receiving a primary synchronization signal, a secondary synchronization signal, or a physical broadcast radio channel associated with the first cell, wherein the one or more synchronization signal block parameters is based at least in part on the primary synchronization signal, the secondary synchronization signal, or the physical broadcast radio channel associated with the first cell.

6. The method of claim 4, further comprising:
inputting the timing synchronization information into a first function of the one or more functions associated with the second cell, wherein an output of the first function comprises a time offset associated with the second cell relative to the first cell;
inputting the one or more synchronization signal block parameters associated with the first cell into a second function of the one or more functions associated with the second cell, wherein an output of the second function comprises one or more synchronization signal block parameters associated with the second cell; and
monitoring the set of control resources associated with the second cell based at least in part on the time offset and the one or more synchronization signal block parameters associated with the second cell.

7. The method of claim 1, wherein the second cell is one cell of a group of one or more cells.

8. The method of claim 7, wherein monitoring the set of control resources comprises:
monitoring multiple sets of control resources associated with the group of one or more cells, wherein each of the multiple sets of control resources associated with a respective cell of the group of one or more cells, and wherein each of the multiple sets of control resources is based at least in part on the synchronization information associated with the first cell being input to one or more respective functions corresponding to the respective cell of the group of one or more cells.

9. The method of claim 8, further comprising:
measuring respective system information for each cell of the group of one or more cells;
selecting the second cell from the group of one or more cells based at least in part on measuring the respective system information for each cell; and
transmitting, to the second cell, a random access message indicating successful decrypting of the system information received from the second cell.

10. The method of claim 1, wherein monitoring the set of control resources comprises:
receiving, from the first cell, the one or more synchronization messages comprising a public cell identity associated with the first cell, a physical broadcast channel associated with the first cell, and a system frame number associated with the first cell.

11. The method of claim 10, wherein the UE is preconfigured with network information indicating that the first cell is associated with the second cell.

12. The method of claim 1, wherein the one or more functions associated with the second cell are preconfigured at the UE.

13. An apparatus for wireless communications at a user equipment (UE), comprising:
a processor;
memory coupled with the processor; and
one or more instructions stored in the memory and executable by the processor to cause the apparatus to, based at least in part on the one or more instructions:
receive one or more synchronization messages from a first cell, the one or more synchronization messages indicating synchronization information associated with the first cell;
derive a broadcast root key based at least in part on a long term key;
derive a cell specific broadcast key associated with a second cell based at least in part on the broadcast root key and a cell identifier of the second cell, the cell identifier of the second cell based at least in part on an identifier of the first cell and a channel number of the first cell;
monitor a set of control resources associated with the second cell for system information associated with the second cell based at least in part on the one or more synchronization messages from the first cell, wherein the set of control resources associated with the second cell is determined by using at least a portion of the synchronization information associated with the first cell as input for one or more functions associated with the second cell; and
receive, via the set of control resources associated with the second cell, the system information associated with the second cell based at least in part on the cell specific broadcast key.

14. The apparatus of claim 13, wherein, to obtain the system information associated with the second cell, the one or more instructions are further executable by the processor to cause the apparatus to, based at least in part on the one or more instructions:
decrypt the system information associated with the second cell based at least in part on the cell specific broadcast key; and
decode the system information associated with the second cell based at least in part on monitoring the set of control resources.

15. The apparatus of claim 14, wherein the one or more instructions are further executable by the processor to cause the apparatus to, based at least in part on the one or more instructions:
transmit, to the second cell and using a set of resources associated with the second cell, a random access message indicating successful decryption of the system information, the set of resources associated with the second cell based at least in part on the system information.

16. The apparatus of claim 13, wherein the one or more instructions to receive the one or more synchronization messages indicating the synchronization information associated with the first cell are further executable by the processor to cause the apparatus to, based at least in part on the one or more instructions:
receive, from the first cell, timing synchronization information and one or more synchronization signal block parameters associated with the first cell.

17. The apparatus of claim 16, wherein the one or more instructions to receive the one or more synchronization signal block parameters are executable by the processor to cause the apparatus to, based at least in part on the one or more instructions:
receive a primary synchronization signal, a secondary synchronization signal, or a physical broadcast radio channel associated with the first cell, wherein the one or more synchronization signal block parameters is based at least in part on the primary synchronization signal, the secondary synchronization signal, or the physical broadcast radio channel associated with the first cell.

18. The apparatus of claim 16, wherein the one or more instructions are further executable by the processor to cause the apparatus to, based at least in part on the one or more instructions:
input the timing synchronization information into a first function of the one or more functions associated with the second cell, wherein an output of the first function comprises a time offset associated with the second cell relative to the first cell;
input the one or more synchronization signal block parameters associated with the first cell into a second function of the one or more functions associated with the second cell, wherein an output of the second function comprises one or more synchronization signal block parameters associated with the second cell; and
monitor the set of control resources associated with the second cell based at least in part on the time offset and the one or more synchronization signal block parameters associated with the second cell.

19. The apparatus of claim 13, wherein the second cell is one cell of a group of one or more cells.

20. The apparatus of claim 19, wherein the one or more instructions to monitor the set of control resources are executable by the processor to cause the apparatus to, based at least in part on the one or more instructions:
monitor multiple sets of control resources associated with the group of one or more cells, wherein each of the multiple sets of control resources associated with a respective cell of the group of one or more cells, and wherein each of the multiple sets of control resources is based at least in part on the synchronization information associated with the first cell being input to one or more respective functions corresponding to the respective cell of the group of one or more cells.

21. The apparatus of claim 20, wherein the one or more instructions are further executable by the processor to cause the apparatus to, based at least in part on the one or more instructions:
measure respective system information for each cell of the group of one or more cells;
select the second cell from the group of one or more cells based at least in part on measuring the respective system information for each cell; and
transmit, to the second cell, a random access message indicating successful decrypting of the system information received from the second cell.

22. The apparatus of claim 13, wherein the one or more instructions to monitor the set of control resources are executable by the processor to cause the apparatus to, based at least in part on the one or more instructions:
receive, from the first cell, the one or more synchronization messages comprising a public cell identity associated with the first cell, a physical broadcast channel associated with the first cell, and a system frame number associated with the first cell.

23. The apparatus of claim 22, wherein the UE is preconfigured with network information indicating that the first cell is associated with the second cell.

24. The apparatus of claim 13, wherein the one or more functions associated with the second cell are preconfigured at the UE.

* * * * *